(12) United States Patent
Sheppard et al.

(10) Patent No.: US 10,072,902 B2
(45) Date of Patent: Sep. 11, 2018

(54) DUAL FLUID VALVE APPARATUS AND SYSTEM FOR CONTROLLING TWO FLUID STREAMS INCORPORATING SAME

(71) Applicant: Dana Canada Corporation, Oakville (CA)

(72) Inventors: Jeff Sheppard, Milton (CA); Ihab Edward Gerges, Oakville (CA)

(73) Assignee: Dana Canada Corporation, Oakville, Ontario (CA)

( * ) Notice: Subject to any disclaimer, the term of this patent is extended or adjusted under 35 U.S.C. 154(b) by 17 days.

(21) Appl. No.: 15/446,195

(22) Filed: Mar. 1, 2017

(65) Prior Publication Data

US 2017/0254604 A1    Sep. 7, 2017

Related U.S. Application Data

(60) Provisional application No. 62/302,477, filed on Mar. 2, 2016, provisional application No. 62/316,035, filed on Mar. 31, 2016.

(51) Int. Cl.
*F01P 7/02* (2006.01)
*F28F 27/02* (2006.01)
(Continued)

(52) U.S. Cl.
CPC ............... *F28F 27/02* (2013.01); *F01P 11/08* (2013.01); *F16K 11/22* (2013.01); *F16K 31/002* (2013.01); *F01P 2060/045* (2013.01)

(58) Field of Classification Search
CPC ..... F01P 11/08; F01P 2060/045; F16K 11/22; F16K 31/002; F28F 27/02
(Continued)

(56) References Cited

U.S. PATENT DOCUMENTS

| 2,511,042 A | 6/1950 | Branson |
| 3,994,269 A | 11/1976 | Takaoka et al. |

(Continued)

FOREIGN PATENT DOCUMENTS

| DE | 102013209856 A1 | 12/2014 |
| WO | 2017070782 A1 | 5/2017 |

OTHER PUBLICATIONS

International Search Report and Written Opinion for Application No. PCT/CA2017/050268, dated May 18, 2017, issued by the Canadian Intellectual Property Office.

(Continued)

*Primary Examiner* — Henry Crenshaw
(74) *Attorney, Agent, or Firm* — Marshall & Melhorn, LLC

(57) ABSTRACT

A valve apparatus for controlling the flow of two sources of a first fluid while preventing mixing of the two fluid sources is disclosed along with a system incorporating the same. The valve apparatus has a first valve chamber with a first valve mechanism for controlling the flow of a first fluid, such as a heated coolant, from a first source. A second valve chamber with a second valve mechanism controls the flow of a first fluid, such as a cooled coolant, from a second source, the first and second valve chambers being fluidly isolated from each other. At least one thermal actuator arranged within a control chamber or control manifold controls operation of the first and second valve mechanisms, the thermal actuator having a first activation temperature for controlling the first valve mechanism and a second activation temperature for controlling the second valve mechanism. A control fluid passing through the control chamber, or control manifold, dictates the operational settings of the first and second valve mechanisms, respectively. The control fluid may com-
(Continued)

prise a fluid to be heated and/or cooled, such as a transmission fluid.

21 Claims, 12 Drawing Sheets

(51) Int. Cl.
    *F01P 11/08*     (2006.01)
    *F16K 11/22*     (2006.01)
    *F16K 31/00*     (2006.01)

(58) Field of Classification Search
    USPC .......................................... 236/34.5
    See application file for complete search history.

(56) References Cited

U.S. PATENT DOCUMENTS

| | | | |
|---|---|---|---|
| 4,964,371 A | 10/1990 | Maeda et al. | |
| 5,503,183 A * | 4/1996 | Fenn ................. | G05D 23/1393 137/495 |
| 5,934,552 A | 8/1999 | Kalbacher et al. | |
| 6,065,682 A | 5/2000 | Frunzetti | |
| 6,398,119 B1 | 6/2002 | Duffer et al. | |
| 7,096,831 B2 | 8/2006 | Finkbeiner et al. | |
| 7,721,973 B2 * | 5/2010 | Peric ................. | F01P 7/14 137/625.49 |
| 8,464,668 B2 | 6/2013 | DiPaola et al. | |
| 8,944,017 B2 | 2/2015 | Glassford | |
| 8,978,596 B2 | 3/2015 | Glassford | |
| 8,978,992 B2 | 3/2015 | Zillig et al. | |
| 9,273,591 B2 | 3/2016 | DiPaola et al. | |
| 9,726,440 B2 * | 8/2017 | Bhatia ............... | F28F 9/22 |
| 2009/0229812 A1 * | 9/2009 | Pineo ................. | F01M 5/00 165/297 |
| 2010/0126598 A1 * | 5/2010 | Peric ................. | F01P 7/14 137/468 |
| 2011/0061744 A1 * | 3/2011 | Zillig ............... | F15B 21/042 137/15.01 |
| 2013/0319634 A1 * | 12/2013 | Sheppard ............ | F28F 27/00 165/96 |
| 2014/0262135 A1 * | 9/2014 | Sheppard ........... | B60H 1/00314 165/42 |
| 2014/0352636 A1 * | 12/2014 | Glassford .......... | F01P 3/12 123/41.08 |
| 2016/0010536 A1 | 1/2016 | Murakami et al. | |
| 2016/0109890 A1 * | 4/2016 | Styron .............. | G05D 23/022 236/34.5 |
| 2016/0146554 A1 * | 5/2016 | Bhatia .............. | F16K 11/0716 165/100 |
| 2016/0349770 A1 * | 12/2016 | Sheppard ............ | F16K 31/002 |

OTHER PUBLICATIONS

English Machine Translation of DE 102013209856.

\* cited by examiner

DUAL FLUID VALVE APPARATUS AND SYSTEM FOR CONTROLLING TWO FLUID STREAMS INCORPORATING SAME

CROSS-REFERENCE TO RELATED APPLICATION

This application claims priority to and the benefit of U.S. Provisional Patent Application No. 62/302,477 filed Mar. 2, 2016; and U.S. Provisional Patent Application No. 62/316, 035 filed Mar. 31, 2016, the contents of the provisional applications being incorporated herein by reference.

FIELD

The specification relates to a valve apparatus, in particular a valve apparatus for controlling two separate fluid streams.

BACKGROUND

The use of valves to control the flow of a fluid within an overall heat exchange circuit within an automobile system is known. Control valves or thermal by-pass valves (TBV) are often used in combination with heat exchangers to either direct a fluid to a corresponding heat exchanger for heating or cooling, or to direct the fluid elsewhere in the heat exchange circuit so as to by-pass the heat exchanger under conditions where the heat transfer function of the heat exchanger is not required or is only intermittently required.

Control valves or thermal by-pass valves are often incorporated into a heat exchange system by way of external fluid lines that are, in turn, connected to an inlet/outlet of a heat exchanger, the control valves being separate to the heat exchanger and being connected either upstream or downstream from the heat exchanger within the external fluid lines. In some applications, multiple control valves or thermal by-pass valves are used in combination in order to achieve a particular control sequence to effectively dictate the fluid flow through the overall heat exchange circuit to ensure that the fluid is directed to the appropriate heat exchanger or automobile system component under the various operating conditions. In other applications, it may be more appropriate to provide a single valve apparatus capable of multiple control functions. However, providing a single valve apparatus that offers multiple control functions sometimes results in the mixing of various fluid streams which is not always desirable for the overall functioning and/or control of the overall heat exchanger circuit.

Therefore, it is desirable to provide a valve apparatus that can provide multiple control functions while preventing mixing of the various fluid streams that are being controlled through the valve in an effort to provide overall fluid circuits or systems that can operate and/or achieve the desired function without the mixing of fluid streams.

SUMMARY OF THE INVENTION

In accordance with an example embodiment of the present disclosure there is provided a valve apparatus, comprising a first valve chamber having a first inlet for receiving a fluid from a first fluid source and a first outlet for discharging said fluid from said first valve chamber; a second valve chamber having a second inlet for receiving a fluid from a second fluid source and a second outlet for discharging said fluid from said second valve chamber; a control chamber fluidly isolated from said first valve chamber and said second valve chamber, said control chamber having a control fluid inlet for receiving fluid from a control source and a control fluid outlet for discharging said control fluid from said control chamber of said valve apparatus; a first valve mechanism arranged within said first valve chamber for controlling fluid flow between said first inlet and said first outlet; a second valve mechanism arranged within said second valve chamber for controlling fluid flow between said second inlet and second outlet; a thermal actuator arranged within said control chamber and operatively coupled to said first valve mechanism and said second valve mechanism, said thermal actuator having a first activation temperature associated with said first valve mechanism and a second activation temperature associated with said second valve mechanism; an outlet fluid line interconnecting said first outlet and said second outlet; and wherein said first valve chamber is fluidly isolated from said second valve chamber.

In accordance with another example embodiment of the present disclosure there is provided a valve apparatus, comprising a main body having a main bore formed therein; a first valve housing secured to said main body and defining a first valve chamber; a second valve housing secured to said main body and defining a second valve chamber; a first fluid inlet and a first outlet formed in said first valve housing in fluid communication with said first valve chamber; a second fluid inlet and a second fluid outlet in fluid communication with said second valve chamber; a first valve mechanism arranged within said first valve housing for controlling flow from said first fluid inlet to said first fluid outlet; a second valve mechanism arranged within said second valve housing for controlling flow from said second fluid inlet to said second fluid outlet; a thermal actuator positioned in said main bore of said main body and operatively coupled to said first valve mechanism and said second valve mechanism, said thermal actuator having a first activation setting for operating said first valve mechanism and a second activation setting for operating said second valve mechanism; a control fluid inlet opening formed in said main body and extending into said main bore providing fluid access to said thermal actuator and a control fluid outlet opening formed in said main body for discharging fluid from said main bore the region of said thermal actuator; wherein said first valve chamber is fluidly isolated from said second valve chamber and wherein a fluid line interconnects said first outlet and said second outlet.

In accordance with another example embodiment of the present disclosure there is provided a system for transmitting one of two coolant streams to a heat exchanger for warming and/or cooling transmission fluid in an automobile vehicle having an engine and a transmission, comprising: a heat exchanger fluidly connected to the transmission for receiving transmission fluid exiting the transmission and directing transmission fluid back to the transmission via a return line, the heat exchanger having an inlet for receiving a coolant stream for heat transfer with the transmission fluid, and an outlet for discharging said coolant source from said heat exchanger; a valve apparatus arranged intermediate said transmission and said heat exchanger and being fluidly coupled to said transmission for receiving transmission fluid exiting said transmission and delivering said transmission fluid to said heat exchanger, the valve apparatus having a first valve chamber for receiving coolant from a first fluid source and a second valve chamber for receiving coolant from a second fluid source, the first valve chamber and second valve chamber each having a fluid outlet that are interconnected by a discharge channel that is fluidly coupled to an inlet of said heat exchanger for delivering the first or second coolant source to said heat exchanger; a first valve mechanism arranged within said first valve chamber for controlling flow of said first coolant source to said heat exchanger; a second valve mechanism arranged within said second valve chamber for controlling flow of said second coolant source to said heat exchanger; wherein said first valve chamber is fluidly isolated from said second valve chamber and wherein only one of said first coolant source and said second coolant source is directed through the discharge channel to the heat exchanger inlet at any one a time.

In accordance with another example embodiment of the present disclosure there is provided a valve apparatus, comprising a first manifold portion for transmitting a control fluid therethrough, said manifold portion having a fluid passage extending therethrough between a control fluid inlet and a control fluid outlet; an intermediate portion mounted to said first manifold portion, the intermediate portion having a first valve chamber and a second valve chamber, the first valve chamber having a first inlet for receiving a fluid from a first fluid source and a first outlet for discharging said fluid from said first valve chamber, the second valve chamber having a second inlet for receiving a fluid from a second fluid source and a second outlet for discharging said fluid from said second valve chamber, the first and second valve chambers of said intermediate portion being fluidly isolated from said first manifold portion and fluidly isolated from each other; a first valve mechanism arranged within said first valve chamber for controlling fluid flow between said first inlet and said first outlet; a second valve mechanism arranged within said second valve chamber for controlling fluid flow between said second inlet and second outlet; a first thermal actuator having a first activation temperature arranged within said first manifold portion in fluid communication with said fluid passage formed therein and operatively coupled to said first valve mechanism; a second thermal actuator having a second activation temperature arranged within said first manifold portion in fluid communication with said fluid passage formed therein and operatively coupled to said second valve mechanism, wherein said second activation temperature is greater than said first activation temperature; and a second manifold portion mounted to said intermediate portion and having a discharge channel formed therein that is fluidly coupled to both said first valve chamber and said second valve chamber and extends to a fluid outlet for discharging either said first fluid source or said second fluid source from said valve apparatus.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Reference will now be made in detail to exemplary implementations of the technology. The example embodiments are provided by way of explanation of the technology only and not as a limitation of the technology. It will be apparent to those skilled in the art that various modifications and variations can be made in the present technology. Thus, it is intended that the present technology cover such modifications and variations that come within the scope of the present technology.

Figure 1:
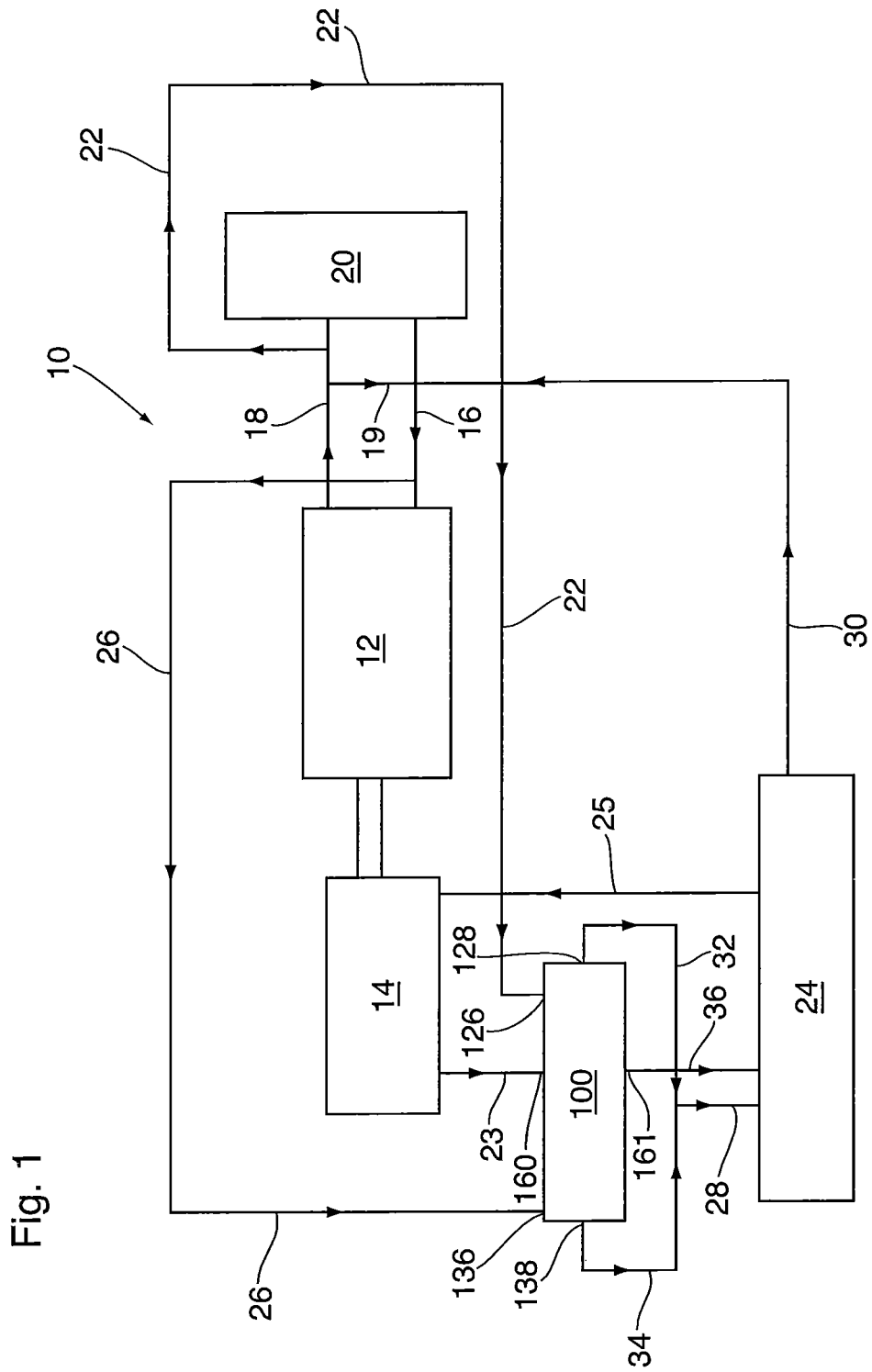
FIG. 1 is a schematic illustration of an exemplary engine and transmission heat exchange circuit incorporating a valve apparatus as shown in FIGS. 2-4.

Referring now to FIG. 1 there is shown a schematic illustration of an exemplary heat exchange circuit 10 for a vehicle engine 12 and a vehicle transmission 14. As shown, the engine 12 is cooled by way of a first fluid, such as engine coolant, that flows through the engine 12 so as to draw heat away from the engine 12 while in operation. The coolant enters the engine 12 through fluid inlet line 16 and exits the engine 12 though fluid outlet line 18. The engine coolant that exits the engine 12 is directed to a first heat exchanger 20, such as a radiator, for cooling. Depending upon the particular operating conditions of the vehicle, it might be desirable to return at least a portion of the engine coolant exiting the engine 12 through fluid outlet line 18 back to the engine 12, for example during warm-up or cold-start conditions, through intermediate fluid line 19 and fluid inlet line 16.

The first fluid, or engine coolant, flowing through the overall heat exchange circuit 10 within the automobile system can also be used elsewhere in the circuit 10 to assist with warming and/or cooling of other fluids circulating within the circuit 10. More specifically, under certain conditions it may be desirable to direct a portion of the warm/hot coolant exiting the engine 12 through fluid outlet line 18 (also referred to herein as the "heated first fluid") for use elsewhere in the circuit 10, for instance through fluid line 22, to a second heat exchanger 24 to assist with the warming of a second fluid flowing through the circuit 10 such as the transmission fluid (or oil) flowing through the transmission 14. Under other operating conditions it may be desirable to direct a portion of the cold engine coolant exiting the first heat exchanger 20 (also referred to herein as the "cooled first fluid") and being returned to the engine 12 through fluid line 16, for instance through fluid line 26, to the second heat exchanger 24 to assist with cooling the second fluid, e.g. the transmission fluid. In order to control whether the heated first fluid in fluid line 22 or the cooled first fluid in fluid line 26 is directed to the second or other heat exchanger 24 within the overall system 10, a valve apparatus 100 according to an example embodiment of the present disclosure is incorporated into the overall heat exchange circuit 10 intermediate the transmission 14 and the second heat exchanger 24 for controlling whether it is the heated first fluid in fluid line 22 that is directed to heat exchanger 24 to assist with warming of the second fluid (e.g. transmission fluid or oil) or if it is the cooled first fluid in fluid line 26 that is directed to the heat exchanger 24 to assist with cooling of the second fluid, the first fluid entering the heat exchanger 24 through heat exchanger inlet line 28 and being returned to its original source, namely the engine 12, through heat exchanger-outlet or return line 30 and fluid line 16.

The operation of valve apparatus 100 is based on the temperature of a control fluid, which in the subject example embodiment is the second fluid exiting the transmission 14 through fluid line 23, the second fluid then being directed to the second heat exchanger 24 through valve apparatus 100 and fluid line 36, as further described below. The second fluid is then returned to the transmission 14 through fluid return line 25 once it has circulated through the second heat exchanger 24. Valve apparatus 100 is particularly suited for selecting between the two fluid sources, namely the heated first fluid stream or the cooled first fluid stream in the subject example embodiment, while preventing any mixing of the heated and cooled first fluid streams at any time as will be described in further detail below. While the above-described embodiment relates primarily to a heat exchange circuit 10 for a vehicle engine 12 and a vehicle transmission 14 with valve apparatus 100 selecting between either a warm/hot coolant source or a cold coolant source based on the temperature of the transmission fluid exiting the transmission 14, it will be understood that the valve apparatus 100 disclosed herein is not necessarily intended to be limited for use in a heat exchange circuit as described and that the valve apparatus 100 can be incorporated into any relevant system requiring the selection between two separate fluid sources based on the temperature of a control fluid while preventing mixing of the two fluid sources at any one time.

Figure 2:
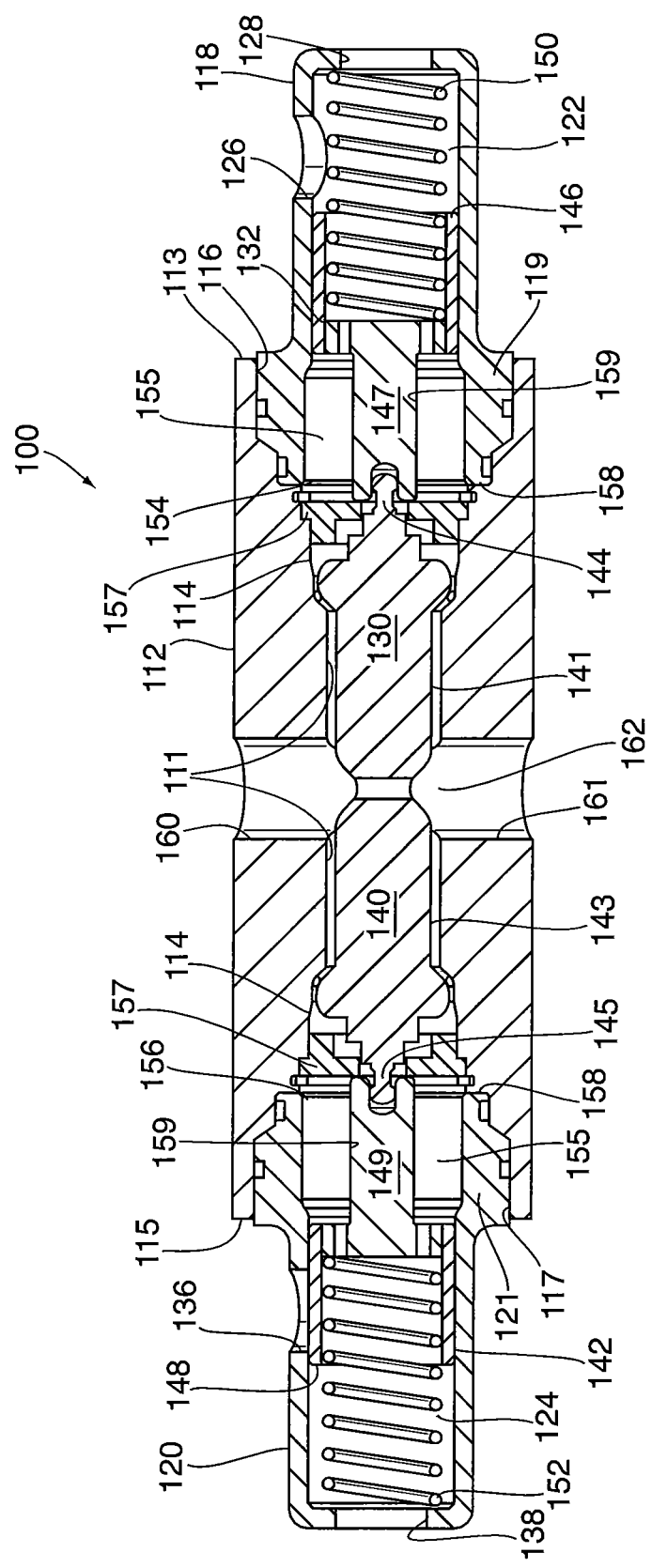
FIG. 2 is a schematic cross-sectional view of an example embodiment of a valve apparatus according to the present disclosure in a first operational state.
Figure 3:
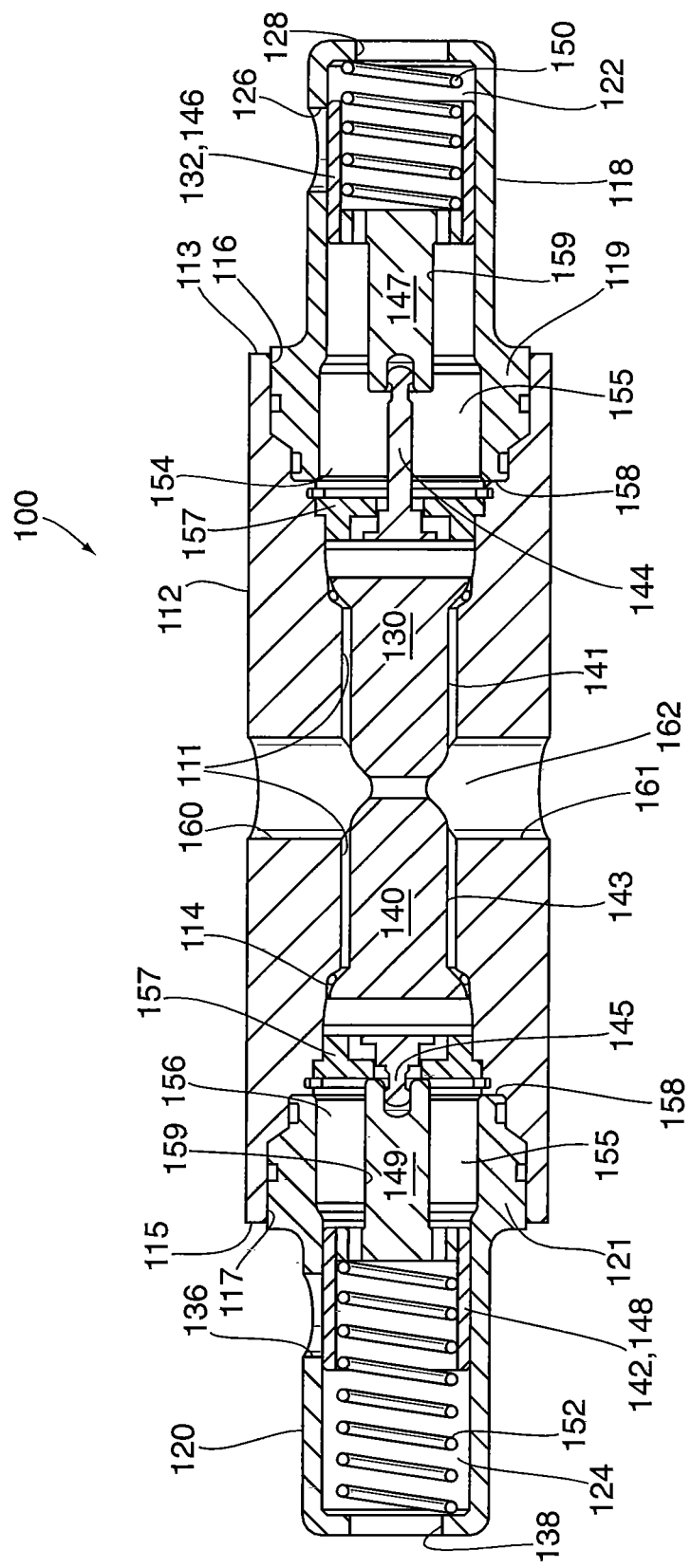
FIG. 3 is a cross-sectional view of the valve apparatus of FIG. 2 in a second operational state.
Figure 4:
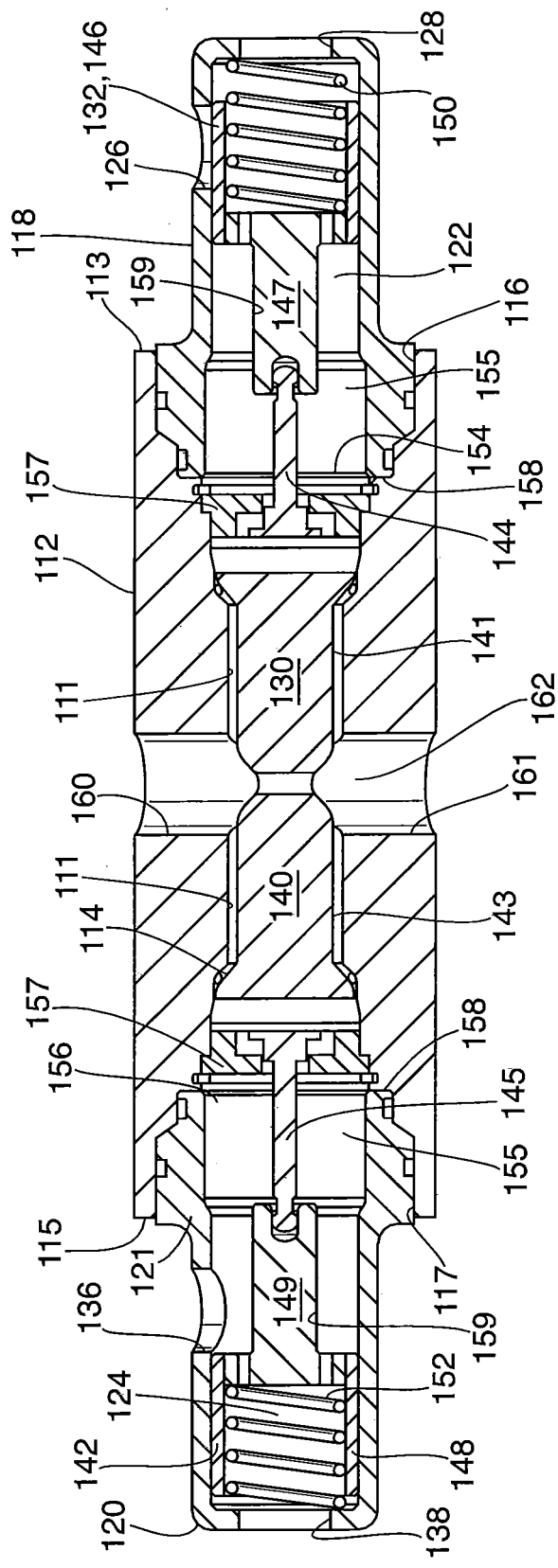
FIG. 4 is a cross-sectional view of the valve apparatus of FIG. 2 in a third operational state.

Referring now to FIGS. 2-4 there is shown an exemplary embodiment of the dual fluid valve apparatus 100 referred to above according to an exemplary embodiment of the present disclosure. In the subject exemplary embodiment, the valve apparatus 100 has a main body 112 with a main bore 114 formed therein that extends between opposed, first and second ends 113, 115 of the main body 112. The main bore 114, therefore, defines corresponding openings 116, 117 in the respective first and second ends 113, 115 of the main body 114. In the subject embodiment, the main bore 114 tapers or otherwise steps-down in diameter from the respective first and second open ends 113, 115 having a first diameter to a generally central portion 111 of the main bore 114 that extends at a generally constant second diameter through a central portion of the main body 112, the first diameter generally being larger than the second diameter of the central portion 111 of the main bore 112.

A first valve housing 118 is arranged at the first end 113 of the main body 112, the first valve housing 118 having a first end 119 that is received within and sealingly engaged in the opening 116 formed in the first end 113 of the main body 112. Similarly, a second valve housing 120 is arranged at the second end 115 of the main body 112, the second valve housing 120 having a first end 121 that is received within and sealingly engaged in the opening 117 formed in the corresponding second end 115 of the main body 112. Each of the first and second valve housings 118, 120 defines an internal cavity or valve chamber 122, 124 for housing a valve mechanism as will be described in further detail below.

The first valve housing 118 has a first inlet 126 (see also FIG. 1) in fluid communication with the corresponding valve chamber 122 and a first outlet 128 (see also FIG. 1) that is also in fluid communication with the corresponding valve chamber 122 for transmitting the heated first fluid in fluid line 22 through the valve apparatus 100 from the first inlet 126 to the first outlet 128 under certain operating conditions. In order to control the flow of the first fluid through the first valve housing 118, a first thermal actuator 130 is arranged within a portion of the central portion 111 of the main bore 114 formed in the main body 112, the thermal actuator 130 being operatively coupled to a first valve mechanism 132 arranged within the first valve housing 118.

The second valve housing 120 is formed with a second inlet 136 and a second outlet 138 (both also shown in FIG. 1), both of which are in fluid communication with the corresponding valve chamber 124 for transmitting the cooled first fluid in fluid line 26 through the valve apparatus 100 from the second inlet 136 to the second outlet 138 under certain operating conditions. In order to control the flow through the second valve housing 120, a second thermal actuator 140 is arranged within the central portion 111 of the main bore 114 of the main body 112 of the valve apparatus 100, for example in back-to-back, end-to end or co-axial arrangement with the first thermal actuator 130. Second thermal actuator 140 is arranged within the main bore 114 so as to be operatively coupled to a second valve mechanism 142 arranged within the second valve housing 120.

The thermal actuators 130, 140 used in the subject exemplary embodiment are not particularly limited. In the subject embodiment, the thermal actuators 130, 140 are each in the form of a wax motor having a body or casing 141, 143 that contains a contractionally, expandable material with a piston 144, 145 coupled thereto. Regardless of the specific type of contractionally expandable material housed within the actuator casing 141, 143, the material for each thermal actuator 130, 140 is specifically selected so as to expand when heated to a specific, predetermined temperature and/or within a specific, predetermined temperature range and to contract when cooled below the predetermined temperature and/or temperature range. The expansion/contraction of the material causes the corresponding piston 144 to move relative to the corresponding actuator casing 143 thereby acting on the corresponding valve mechanism 132, 142. While thermal actuators 130, 140 in the form of wax motors are contemplated in the subject exemplary embodiment, it will be understood that electronic actuators that are specifically programmed to activate as specific temperature ranges can also be employed. Therefore, the present disclosure is not intended to be limited to thermal actuators in the form of wax motors.

The valve mechanisms 132, 142 that are arranged in each of the first and second valve housings 118, 120 are similar in structure and each include a sleeve member 146, 148 that is operatively coupled to the corresponding piston 144, 145 of the corresponding thermal actuator 130, 140 by an intermediate shaft 147, 149. Each sleeve member 146, 148 is connected to an end portion of one of the intermediate shafts 147, 149, the end portion having a radially outwardly extension which cooperates with the sleeve member 146, 148 to form a cup-shaped element having a perforated bottom to permit passage therethrough of the first fluid. In this regard, the radially outwardly extending end portions of the intermediate shafts 147, 149 are shown as having a plurality of apertures to permit passage therethrough of the first fluid. Each sleeve member 146, 148 is sized so as to fit within the corresponding valve housing 118, 120 and slide along or reciprocate within the corresponding valve chamber 122, 124 thereby allowing each of the sleeve members 146, 148 to move between a respective first valve position and a respective second valve position as will be discussed in further detail below in relation to the operation of the valve apparatus 100. Accordingly, for each of the valve mechanisms 132, 142 the sleeve member 146, 148 acts as an incremental flow regulator as it incrementally moves between its first and second positions with sleeve member 146 of the first valve mechanism 132 incrementally closing first inlet 126 as the thermal material housed within first thermal actuator 130 is activated, and with sleeve member 148 incrementally opening second inlet 136 as the thermal material housed within second thermal actuator 140 is activated. It will be appreciated that the positions of the inlet and outlet of one or both of the valve housings 118, 120 can be reversed, so that the first inlet and outlet 126, 128 of the first valve housing 118 are reversed and/or the second inlet and outlet 136, 138 of the second valve housing 120 are reversed.

Each valve mechanism 132, 142 is also provided with a return spring 150, 152 arranged between the corresponding sleeve member 146, 148 and the end wall of the corresponding valve housing 118, 120 for biasing the corresponding sleeve member 146, 148 to its first or neutral position, i.e. the position shown in FIG. 2. In the illustrated embodiment, one end of each spring 150, 152 is received inside sleeve member 146, 148, and this end of the spring 150, 152 engages and is biased against the radially expanded end portion of the intermediate shaft 147, 149 as shown.

In order to ensure proper functioning of the valve apparatus 100 and to achieve the desired flow pattern through the device, each thermal actuator 130, 140 is specifically selected to activate at a different temperature range with one having an activation setting or activation temperature that is higher than the other one. More specifically, in the subject exemplary embodiment, the first thermal actuator 130 is specifically selected so as to be activated above a first predetermined temperature such as about 75 degrees C., and/or within a first predetermined temperature range of about 75-85 degrees C., and to remain activated at temperatures above the first predetermined temperature range. The second thermal actuator 140 is specifically selected so as to activate at a second predetermined temperature that is greater than the first predetermined temperature and/or the first predetermined temperature range, and to remain activated at temperatures above the second predetermined temperature. Accordingly, in the subject exemplary embodiment, the second thermal actuator 140 is specifically selected so as to be activated at, for example, above a second predetermined temperature of about 90 degrees C. For example, actuation of the second thermal actuator 140 may begin at about 90 degrees C., and may be complete at about 100 degrees C. While specific activation temperatures have been disclosed herein it will be understood that the present disclosure is not intended to be limited to these temperatures and that these predetermined activation temperatures may change depending on the particular application or the particular activation sequence that is required for a particular application. Additionally, while the first and second thermal actuators 130, 140 are shown as being two separate thermal actuators 130, 140 that are independent to each other, in other embodiments, a single thermal actuator that is structured so as to house two different thermal materials within two separate chambers formed within a single actuator casing may also be employed. Thermal actuators of this type are disclosed in Applicant's co-pending International Patent Application No. PCT/CA2016/051243 entitled "MULTI-STAGE BY-PASS VALVE" as filed on Oct. 27, 2016, the disclosure of which is hereby expressly incorporated herein by reference.

In order to ensure that there is no mixing of the first fluid entering the valve apparatus 100 through first inlet 126 and the second fluid entering the valve apparatus 100 through second inlet 136, valve chambers 122, 124 are both fluidly isolated from the central portion 111 of the main bore 114 formed within the main body 112 by means of any suitable sealing device or valve cap 154, 156 and, as a result, are fluidly isolated from each other. In the exemplary embodiment, each valve housing 118, 120 is sealed by a valve cap 154, 156 having a first end 155 that is sealingly engaged within the open end 158 of the corresponding valve housing 118, 120 and a second end 157 that engages with an end of the corresponding thermal actuator 130, 140 and seals against the walls that define the main bore 114. An opening 159 extends through each of the valve caps 154, 156 for receiving the corresponding intermediate shaft 147, 149, the intermediate shaft 147, 149 being sized to allow for sliding movement within the opening 159 while maintaining a fluid seal therewith so that fluid entering valve chambers 122, 124 does not leak past the intermediate shaft 147, 149 and corresponding valve cap 154, 156.

The second end 157 of each valve cap 154, 156 may be specifically shaped to provide support to the thermal actuator 130, 140 so as to facilitate the mounting of the thermal actuators 130, 140 within the main bore 114 as well as to facilitate the mechanical engagement between the piston 144, 145 and the corresponding intermediate shaft 147, 149. The mounting of the thermal actuator 130, 140 within the second end 157 of the valve cap 154, 156 also serves to ensure that a fluid tight seal is maintained for all stages of movement of the corresponding piston 144, 145 and intermediate shaft 147, 149 when the respective thermal actuators 130, 140 are activated.

While valve caps 154, 156 serve to fluidly isolate valve chambers 122, 124 from each other, they also serve to fluidly isolate valve chambers 122, 124 from the central portion 111 of the main bore 114 wherein the thermal actuators 130, 140 are mounted, the central portion 111 therefore serving as a control chamber 162 that is fluidly isolated from valve chambers 122, 124.

A control chamber inlet opening 160 extends through the main body 112 of the valve apparatus 100 into the central portion 111 of the main bore 114, the control chamber 162 extending through the main bore 114 to control chamber outlet opening 161. The control fluid is therefore able to flow directly through the control chamber 162 from inlet opening 160 to outlet opening 161 without any fluid communication with the first fluid being transmitted through either valve chamber 122 or 124. The control chamber 162 may extend substantially perpendicularly through the main body 112 into the main bore 114 so as to provide fluid access to the thermal actuators 130, 140 arranged within the central portion 111 of the main bore 114. In the subject example embodiment, an end portion of the casing 141, 143 of each of the thermal actuators 130, 140 is positioned within the control chamber 162 such that the control fluid is in direct thermal contact with both thermal actuators 130, 140 as it flows through the control chamber 162.

The control fluid in the present embodiment is the second fluid, i.e. the transmission fluid or oil. Therefore, as shown in FIG. 1, the fluid outlet line 23 from the transmission 14 is coupled to control chamber inlet opening 160, while the control chamber outlet opening 161 is coupled to the fluid line 36 connecting the valve apparatus 100 to the second heat exchanger 24. Accordingly, it is the temperature of the second fluid passing through control chamber 162 that dictates flow through the valve apparatus 100 as this control fluid, e.g. transmission fluid, is brought into direct contact with the thermal actuators 130, 140 housed within valve apparatus 100.

Operation of the valve apparatus 100 will now be described in reference to FIGS. 2-4. FIG. 2 illustrates the valve apparatus 100 in its first operational state. As shown, the first valve mechanism 132 arranged within the first valve housing 118 is in its first or neutral position with the sleeve member 146 being at its leftmost position (in reference to FIG. 2) within first valve housing 118 so that first inlet 126 is open and in fluid flow communication with the first outlet 128. The second valve mechanism 142 arranged within the second valve housing 120 is also in its first or neutral position with second inlet 136 being blocked or effectively closed by sleeve member 148 which is in its rightmost position (in reference to FIG. 2), such that there is no fluid flow communication between the second inlet and outlet 136, 138.

Accordingly, when the control fluid (second fluid) flowing through control chamber 162 is at a temperature below the first predetermined temperature range, for example below 75 degrees C., the first and second valve mechanisms 132, 142 remain in their first, neutral positions and the valve apparatus 100 remains in the first operational state. In this state, the heated first fluid in fluid line 22 is directed through first inlet 126 to first outlet 128 where the heated first fluid exits the valve apparatus 100 and is directed to the second heat exchanger 24 through fluid outlet line 32 and heat exchanger inlet line 28. As it circulates through the second heat exchanger, the heated first fluid transfers heat to the second fluid, which is at a temperature below the first predetermined temperature range as it enters the second heat exchanger 24 through fluid line 36.

After transferring heat to the second fluid in the second heat exchanger 24, the first fluid is returned to its original source, for example the engine 12, through fluid return line 30. The cooled first fluid in fluid line 26 does not enter the valve apparatus 100 through second inlet 136 in the first operational state.

As the temperature of the control fluid being transmitted through control chamber 162 increases to within a first predetermined temperature range during operation of the vehicle, e.g. to a temperature of about 75-85 degrees C., the valve apparatus 100 adopts a second operational state which is shown in FIG. 3. To change from the first to the second operational state, the increased temperature of the control fluid in control chamber 162 actuates the first thermal actuator 130, for example by heating the contractionally expandable material in the casing 141 of first thermal actuator to a temperature within the first predetermined temperature range, causing the material to expand. The expansion of the material inside the first thermal actuator 130 causes the piston 144 to be pushed out of the casing 141. The piston 144 moves sleeve member 146 to the right of the first valve housing 118 along its valve chamber 122 (in reference to FIG. 3), effectively closing first inlet 126, the sleeve member 146 acting against the biasing force of return spring 150.

In the second operational state, the temperature of the control fluid passing through the control chamber 162 is below a second predetermined temperature range, and the second valve mechanism 142 remains in its first, neutral position with second inlet 136 being closed. Therefore, in the second operational state of valve apparatus 100, both the first inlet 126 and second inlet 136 are closed, effectively preventing heated first fluid in fluid line 22 or cooled first fluid in fluid line 26 from being transmitted to the second heat exchanger 24 through valve apparatus 100. Both the heated first fluid and the cooled first fluid streams effectively bypass heat exchanger 24 and are directed elsewhere in the circuit 10 or are simply returned directly to the fluid source, for example engine 12 or first heat exchanger 20. Therefore, in the second operational state, the second fluid is neither actively heated nor cooled as it flows through the second heat exchanger 24. In other words, the first predetermined temperature range is the desired operational temperature range of the second fluid, and the second fluid requires neither heating nor cooling within this range.

As the temperature of the control fluid further increases to second predetermined temperature, e.g. a temperature of about 90 degrees C., the valve apparatus 100 adopts a third operational state which is shown in FIG. 4. For example, actuation of the valve apparatus 100 from the second to third operational state may begin at a temperature of about 90 degrees C., and may be complete at about 100 degrees C. In the third operational state, the first valve mechanism 132 remains in its second position with sleeve member 146 effectively closing first inlet 126, since the first thermal actuator 130 has already been activated at the first predetermined temperature range. As the temperature of the control fluid increases to a temperature within the second predetermined temperature range during operation of the vehicle, e.g. a temperature greater than about 90 degrees C., the control fluid flowing through control chamber 162 heats the contractionally expandable material in the casing 143 of second thermal actuator 140 to a temperature greater than about 90 degrees C., causing the material to expand. The expansion of the material inside the second thermal actuator 140 causes the piston 145 to be pushed out of the casing 143. The piston 145 moves sleeve member 148 to the left of the second valve housing 120 (in reference to FIG. 4) along valve chamber 124, thereby opening second inlet 136, the sleeve member 148 acting against the biasing force of return spring 152.

Opening the second inlet 136 establishes fluid flow communication between second inlet 136 and second outlet 138 through valve chamber 124, and specifically through the apertures in the radially expanded end portion of the intermediate shaft 149, the radially expanded end portion of shaft 149 being positioned between the second inlet 136 and the second outlet 138. Therefore, in the third operational state of valve apparatus 100, the cooled first fluid in fluid line 26 enters the valve apparatus 100 through second inlet 136 and is directed through second outlet 138 to the corresponding attached fluid line 34 which feeds directly into heat exchanger inlet line 28 to heat exchanger 24. The cooled first fluid travelling through fluid line 34 does not come into contact with the heated first fluid since first inlet 126 is effectively sealed by sleeve member 146 in this operational state. For example, no mixing occurs between the cooled first fluid exiting the valve apparatus 100 through second outlet 138 and any of the heated first fluid that may still be present in the first valve chamber 122. Therefore, while fluid lines 32, 34 serve as a common discharge channel for the valve apparatus 100, and together feed the heat exchanger inlet line 28, the first and second valve chambers 122, 124 remain fluidly isolated from each other.

Therefore, in the third operational state of valve apparatus 100, the first inlet 126 remains closed while the second inlet 136 is open. Therefore, in the third operational state, flow of the cooled first fluid in fluid line 26 is permitted to flow through valve apparatus 100 to the second heat exchanger 24, while the flow of the heated first fluid in fluid line 22 is prevented from flowing through valve apparatus 100 to the second heat exchanger 24. Therefore, in the third operational state, the second fluid is actively cooled as it flows through the second heat exchanger 24.

While the valve apparatus 100 has been shown in FIGS. 2-4 as having two fluidly isolated valve housings 118, 120 secured together or interconnected by a main body 112 thereby providing a single valve apparatus 100 capable of providing fluid routing for two separate incoming fluid streams while preventing any mixing between the two separate fluid streams, in other embodiments, the valve apparatus 100 can be made up of two separate valve members 100(1), 100(2) that are physically separate to each other but that function together to provide the same fluid routing and activation states as will be described in further detail below in connection with FIGS. 5-10.

Figure 5:
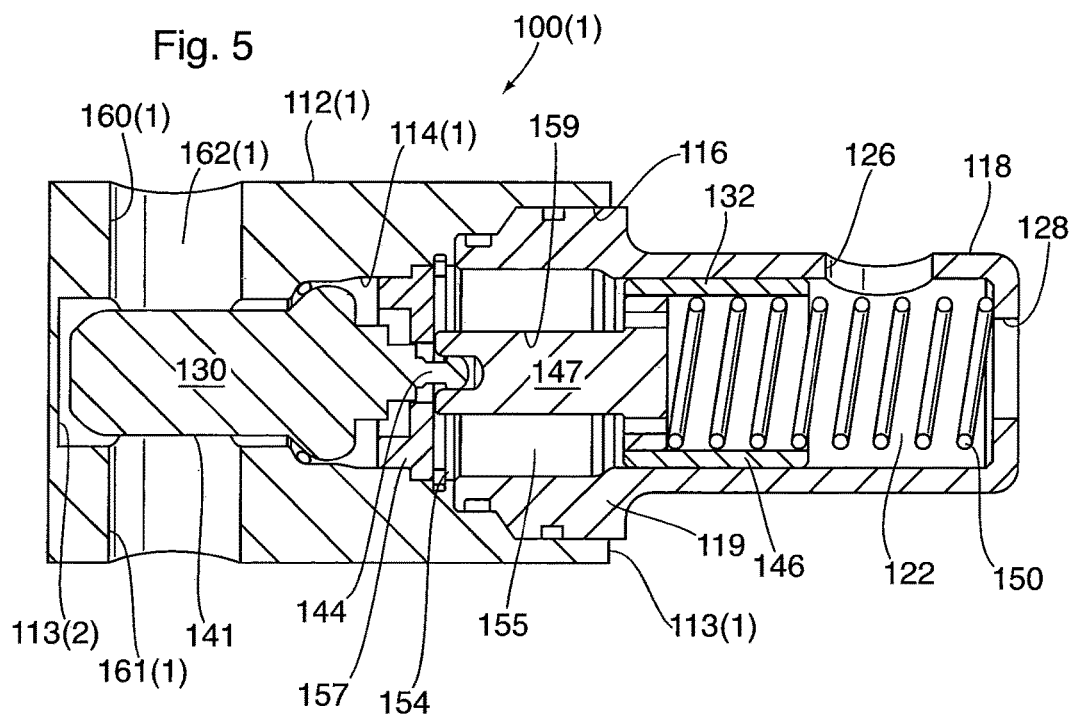
FIG. 5 is a cross-sectional view of a first valve for forming a valve apparatus according to another example embodiment of the present disclosure in its first operational state.
Figure 7:
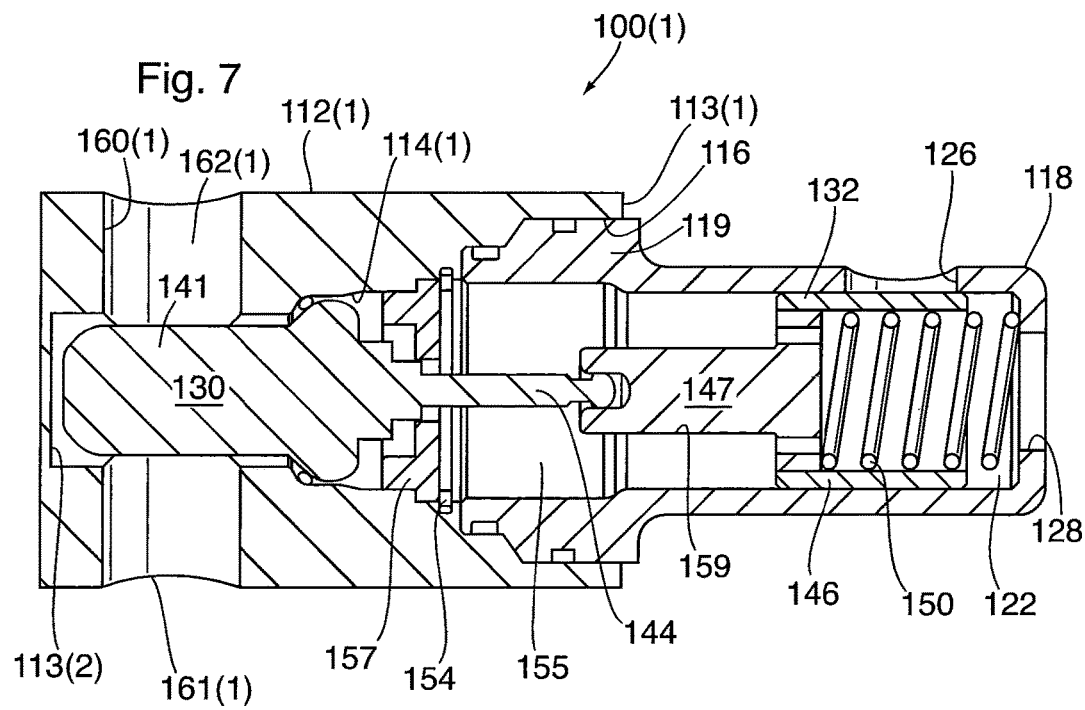
FIG. 7 is a cross-sectional view of the first valve of FIG. 5 in its second operational state.
Figure 9:
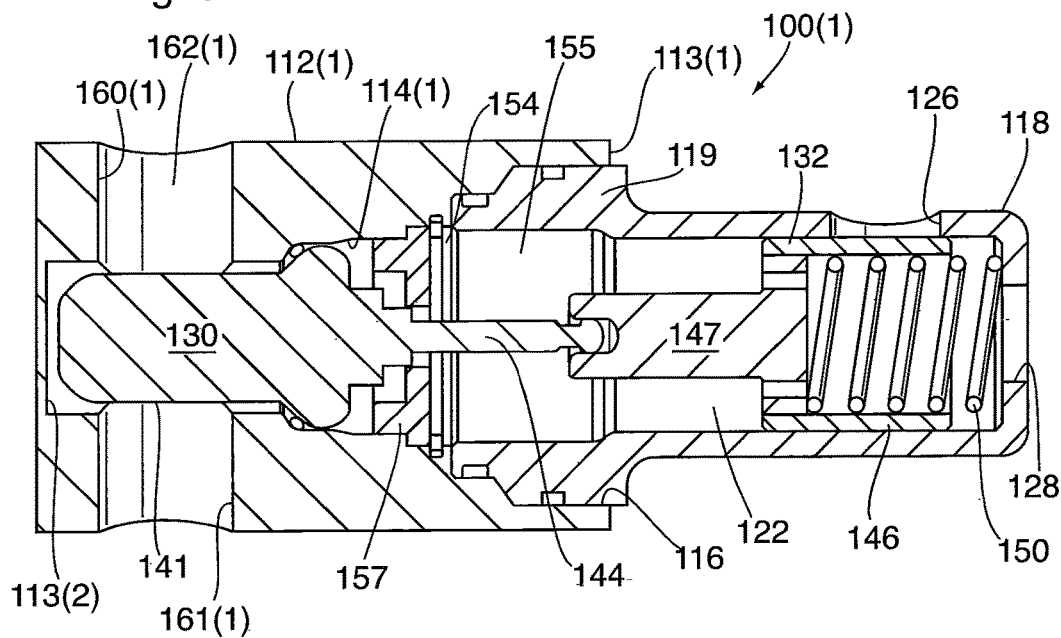
FIG. 9 is a cross-sectional view of the first valve of FIG. 5 in its third operational state.

Referring now to FIGS. 5, 7 and 9, there is shown the first valve member 100(1) that forms the first portion of the valve apparatus 100 according to another exemplary embodiment of the present disclosure. As shown, valve member 100(1) is formed of a main body 112(1) having a main bore 114(1) that extends within the main body 112(1) from a first end 113(1) thereof and terminates at a closed, second end 113(2) within the main body 112(1). The main bore 114(1) therefore defines a corresponding opening 116 in the first end 113(1) of the main body 112(1). In the subject embodiment, the main bore 114(1) tapers or otherwise steps-down in diameter from the open end 116 to the closed, second end 113(2).

As in the previously described embodiment, a first valve housing 118 is arranged at the first, open end 113(1) of the main body 112(1) of the first valve member 100(1), the first valve housing 118 having a first end 119 that is received within and sealingly engaged in the opening 116 formed in the first end 113(1) of the main body 112(1). The first valve housing 118 is similar in structure to the previously described first valve housing 118 in the embodiment shown in FIGS. 2-4 and defines valve chamber 122 with a first inlet 126 and a first outlet 128, both of which are in fluid communication with the internal valve chamber 122 for transmitting the heated first fluid stream through the valve apparatus 100. Valve mechanism 132 is arranged within the first valve housing 118 and is operatively coupled to first thermal actuator 130 by means of the engagement between piston 144 and intermediate shaft 147 as described above. Accordingly, once the first thermal actuator 130 activates, the piston 144 is pushed out of the actuator casing 141, causing the valve sleeve 146 to move along valve chamber 122 from its first neutral or open position (as shown in FIG. 5) to its second or closed position shown in FIGS. 7 and 9. Valve cap 154 fluidly seals valve chamber 122 and provides support to the first thermal actuator 130 to ensure proper alignment and engagement of the piston 144 with the valve mechanism 132.

Figure 6:
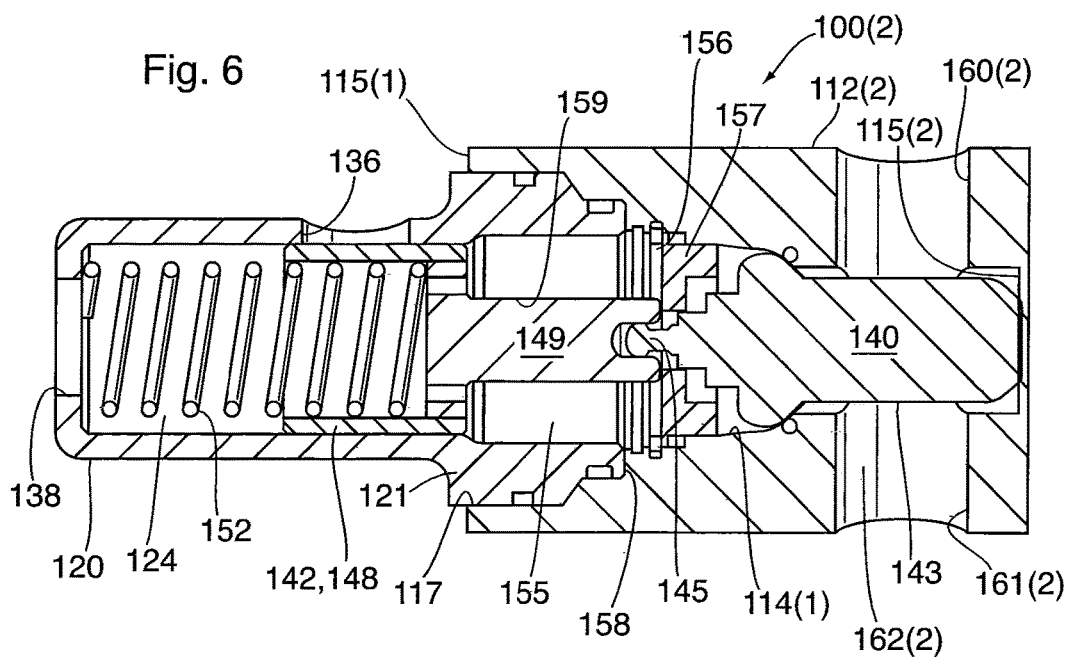
FIG. 6 is a cross-sectional view of a second valve for use in conjunction with the first valve of FIG. 5 also in its first operational state.
Figure 8:
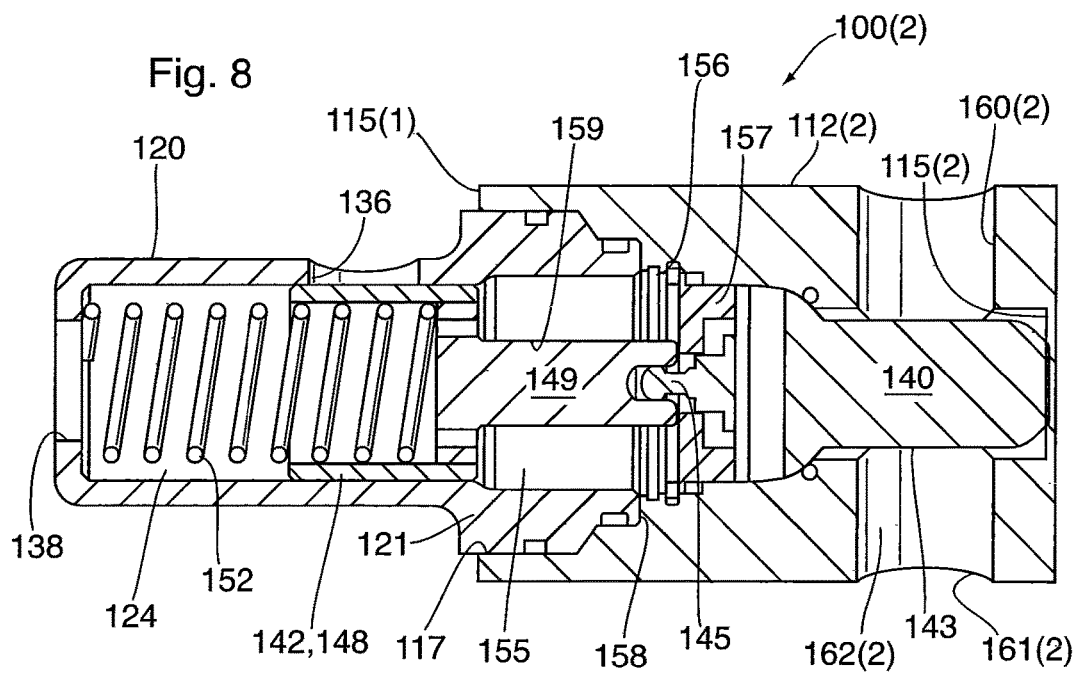
FIG. 8 is a cross-sectional view of the second valve of FIG. 6 in its second operational state.
Figure 10:
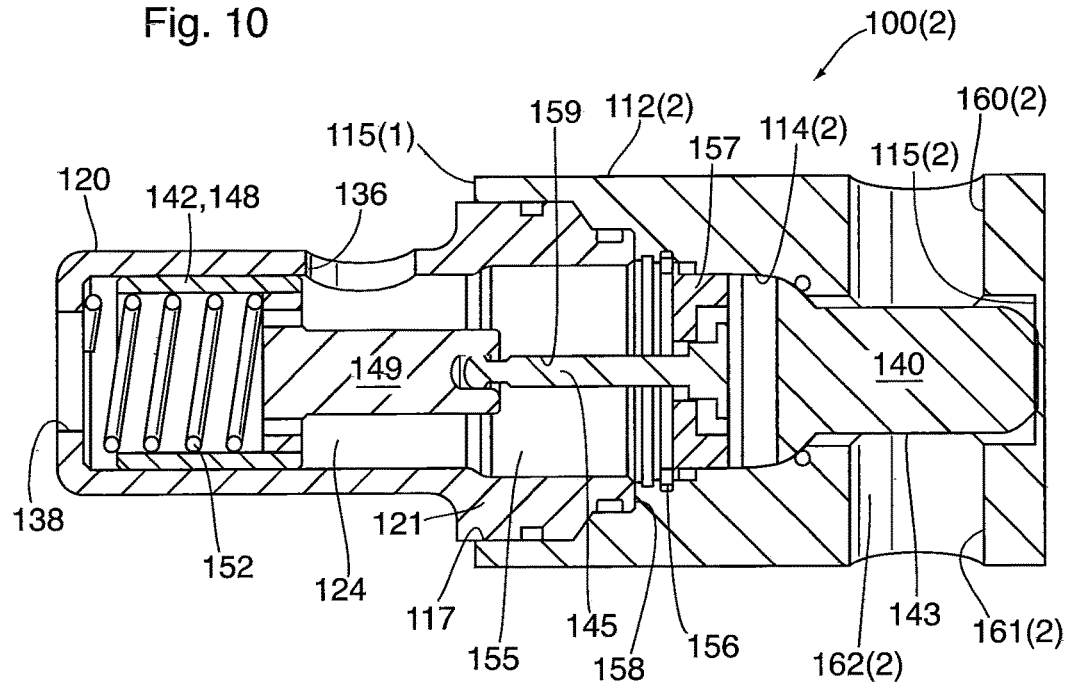
FIG. 10 is a cross-sectional view of the second valve of FIG. 6 in its third operational state.

Referring now to FIGS. 6, 8 and 10, the second valve member 100(2) that forms part of the valve apparatus 100 is illustrated in its various operational states which are similar to those described above in connection with the embodiment shown in FIGS. 2-4. More specifically, the second valve member 100(2) is also formed of a main body 112(2) having a main bore 114(2) that extends within the main body 112(2) from a first end 115(1) thereof and terminates at a closed, second end 115(2) within the main body 112(2). The main bore 114(2) therefore defines a corresponding opening 117 in the first end 115(1) of the main body 114(2). In the subject embodiment, the main bore 114(2) tapers or otherwise steps-down in diameter from the first, open end 115(1) to the closed, second end 115(2).

The second valve housing 120 is arranged at the first end 115(1) of the main body 112(2) of the second valve member 100(2), the second valve housing 120 having a first end 121 that is received within and sealingly engaged in the opening 117 formed in the first end 115(1) of the main body 112(2). The second valve housing 120 is similar in structure to the previously described second valve housing 120 in the embodiment shown in FIGS. 2-4 and defines valve chamber 124 with a second inlet 136 and a second outlet 138, both of which are in fluid communication with the internal valve chamber 124 for transmitting the cooled first fluid stream through the valve apparatus 100.

Valve mechanism 142 is arranged within the second valve housing 120 and is operatively coupled to second thermal actuator 140 by means of the engagement between the actuator piston 145 associated with the second thermal actuator 140 and the intermediate shaft 149 associated with the sleeve member 148 of the valve mechanism 142 as described above in connection with FIGS. 2-4. Accordingly, once the second thermal actuator 140 activates, the piston 145 is pushed out of the actuator casing 143 causing the valve sleeve 148 to move along valve chamber 124 from its first, neutral or closed position (as shown in FIGS. 6 and 8) to its second or open position shown in FIG. 10. Valve cap 156 fluidly seals valve chamber 124 and provides mounting support to the second thermal actuator 140 to ensure proper alignment and engagement of the piston 145 with the components of the valve mechanism 142.

The main body 112(1), 112(2) of each of the first and second valve members 100(1), 100(2) is formed with a control fluid inlet opening 160(1), 160(2) and a control fluid outlet opening 161(1), 161(2) that extend into the main body 112(1), 112(2) so as to form a control chamber 162(1), 162(2) of the main bore 114(1), 114(2). Accordingly, where two separate control chambers 162(1), 162(2) are provided, as shown in FIGS. 5-10, the transmission fluid outlet line 23 is branched into two separate streams that are directed to the corresponding first and second valve members 1-00(1), 100(2) for controlling and actuating the corresponding first and second thermal actuators 130, 140.

Figure 11:
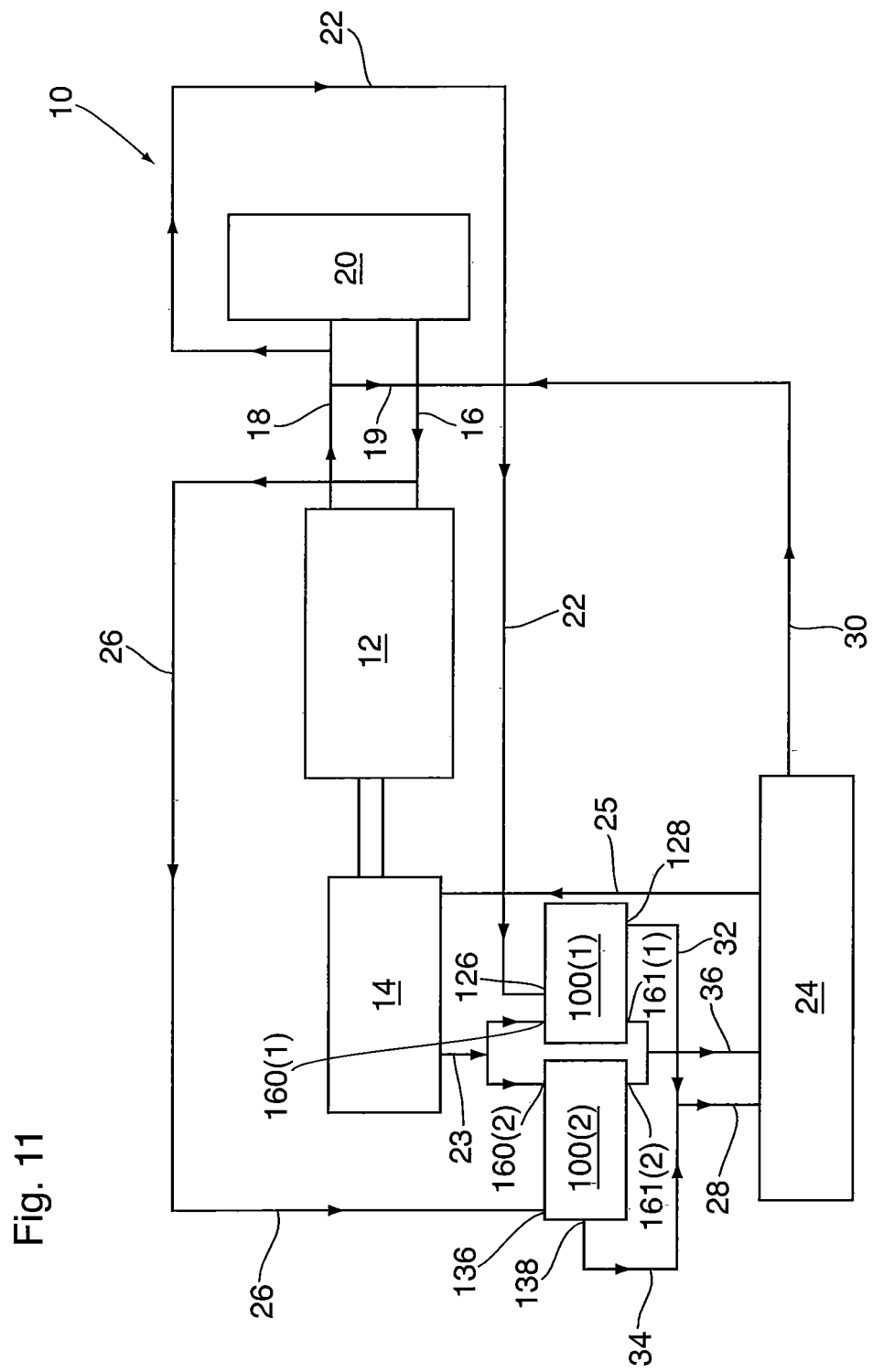
FIG. 11 is a schematic illustration of an exemplary engine and transmission heat exchange circuit incorporating a valve apparatus comprised of the first and second valves of FIGS. 5-10.

Referring now to FIG. 11, the operation of the valve apparatus 100 in relation to the embodiment shown in FIGS. 5-10 is described in further detail.

The heat exchange circuit 110 shown in FIG. 11 shares many common elements with circuit 10 shown in FIG. 1, and like elements are identified therein by like reference numerals.

Similar to the embodiment described in connection with FIGS. 2-4, the first thermal actuator 130 in first valve member 100(1) is selected so as to activate at a first predetermined temperature range, and to remain activated at temperatures above the first predetermined temperature range. The second thermal actuator 140 in the second valve member 100(2) is selected so as to activate at a second predetermined temperature that is higher than the first predetermined range, and to remain activated at temperatures above the second predetermined temperature. Accordingly, the second valve mechanism 142 in the second valve member 100(2) can be activated only once the first valve mechanism 132 in the first valve member 100(1) has fully activated.

As described above in connection with the embodiment of FIGS. 2-4, the main body 112(1), 112(2) of both the first valve member 100(1) and the second valve member 100(2) are each provided with control chambers 162 (1), 162(2) which together provide means for transmitting the control fluid through the valve members 100(1), 100(2).

As described above, valve apparatus 100 when formed by two separate valve members 100(1), 100(2) is particularly suited to select between two separate sources of the heated and cooled first fluid for delivery to the second heat exchanger 24 under particular operating conditions while preventing any mixing of the first fluid streams from the two separate sources. Accordingly, under certain operating conditions it is desirable to direct the heated first fluid to the second heat exchanger 24 to provide heating of the second fluid circulating within the circuit 10.

Accordingly, the heated first fluid in fluid line 22, for instance heated engine coolant exiting engine 20, is directed to the first valve member 100(1) through fluid line 22 where it enters valve chamber 122 through first inlet 126 formed in the first valve housing 118. Provided that the temperature of the second fluid flowing through the control chamber 162(1) of the first valve member 100(1) is below the first predetermined temperature range, e.g. below 75 degrees C., the first valve mechanism 132 remains in its first, neutral or open position, as shown in FIG. 5, defining the first operational state of the first valve member 100(1). In the first operational state, the heated first fluid is permitted to flow from first inlet 126 to first outlet 128 where it is directed to heat exchanger 24, through fluid line 32 and heat exchanger inlet line 28.

With the first valve member in its first operational state as shown in FIG. 5, the cooled first fluid in fluid line 26, e.g. cold coolant exiting radiator 20, is not permitted to flow through the second valve member 100(2) because the second valve mechanism 142 in the second valve member 100(2) remains in its first, neutral or closed position as shown in FIG. 6, which defines the first operational state of the second valve member 100(2). Thus, with the first and second valve members 100(1) and 100(2) in their first operational states, the second fluid will be actively heated by thermal contact with the heated first fluid in the second heat exchanger 24.

As the temperature of the control fluid entering the control chambers 162(1), 162(2) of valve members 100(1), 100(2) increases to within the first predetermined temperature range, e.g. to a temperature of 75-85 degrees C., the first thermal actuator 130 in valve member 100(1) is actuated and the first valve mechanism 132 moves from its first open position shown in FIG. 5 to its second, closed position shown in FIG. 7, thereby effectively preventing the heated first fluid from entering valve chamber 122. The closed position of the first valve mechanism 132 shown in FIG. 7 defines the second operational state of the first valve member 100(1).

With the control fluid flowing through the control chamber 162(2) of the second valve member 100(2) at a temperature within the first predetermined temperature range, the second thermal actuator 140 in second valve member 100(2) is not actuated, and therefore the second operational state of the second valve member 100(2) shown in FIG. 8 is the same as its first operational state shown in FIG. 6. Therefore, in the second operational state of the second valve member 100(2), the heated first fluid in fluid line 22 is prevented from entering the second valve member 100(2). Accordingly, with the first and second valve members 100(1) and 100(2) in their second operational states, both the heated and cooled first fluid streams are prevented from flowing through the valve apparatus 100 to the second heat exchanger 24. Therefore, in the second operational state, the second fluid is neither actively heated nor cooled as it passes through the second heat exchanger 24.

As the temperature of the control fluid being transmitted through control chambers 162(1), 162(2) of valve members 100(1), 100(2) further increases to a temperature that is above the first predetermined temperature range and equal to or greater than a second predetermined temperature, e.g. about 90 degrees C., the second thermal actuator 140 within the second valve member 100(2) activates, causing the second valve mechanism 142 to move from its first, closed position shown in FIGS. 6 and 8 to its second, open position as shown in FIG. 10. The open position of the second valve mechanism 142 shown in FIG. 10 defines the third operational state of the second valve member 100(2). For example, actuation of the second valve member 100(2) from the second to third operational state may begin at a temperature of about 90 degrees C., and may be complete at about 100 degrees C.

In the third operational state of second valve member 100(2), the cooled first fluid exiting the radiator 20 flows through fluid line 26 to second valve member 100(2), entering through second inlet 136 and flowing through valve chamber 124 to second outlet 138 where it is directed to second heat exchanger 24 through fluid line 34 and heat exchanger inlet line 28. No fluid from fluid line 34 seeps back into the first valve chamber 122 through first outlet 128 since the sleeve member 146 of valve mechanism 132 in the first valve housing 118 effectively seals the first outlet 128, thereby preventing any mixing of the heated and cooled fluid streams from fluid lines 22, 26. Therefore, while the respective first and second outlets 128, 138 may be interconnected by fluid lines or discharge channels 32, 34 which both feed directly into heat exchanger inlet line 28 at a junction, the heated and cooled first fluid streams are fluidly isolated from each other since only one fluid can travel through fluid lines or discharge channel 32, 34 at any given time.

With the control fluid flowing through the control chamber 162(1) of the first valve member 100(1) at a temperature above the first predetermined temperature range, the first thermal actuator 130 in first valve member 100(1) remains activated, and therefore the third operational state of the first valve member 100(1) shown in FIG. 9 is the same as its second operational state shown in FIG. 7. Thus, with the first and second valve members 100(1) and 100(2) in their third operational states, the second fluid will be actively cooled by thermal contact with the cooled first fluid in the second heat exchanger 24.

Referring now to FIGS. 12-15, there is shown another example embodiment of a valve apparatus 200 according to the present disclosure wherein like reference numerals to those used in connection with the previously described embodiments have been used to identify similar features, where appropriate.

In the subject example embodiment, the valve apparatus 200 has a main body 212 that is made up of three main sections that are secured together to form the main body 212. More specifically, the main body 212 has a first manifold portion 214 having a main bore 216 extending through the first manifold portion 214 from an inlet end 218 to an outlet end 220 for transmitting a control fluid therethrough as illustrated by flow directional arrow 221. Two, spaced apart control bores 222, 224 are also formed within the first manifold portion 214 for receiving and securing the casings 141, 143 of first and second thermal actuators 130, 140 therein. The control bores 222, 224 are open at both ends and extend generally perpendicularly to the main bore 216 from an open end 217 of the first manifold portion 214 (the upper end in FIGS. 12-14) to the main bore 216, thereby exposing the first and second thermal actuators 130, 140 to direct contact with the control fluid flowing through the main bore 216 of the first manifold portion 214. Therefore, the main bore 216 provides a control chamber similar to control chambers 162 of the embodiments described above.

As in the previously described embodiments, the first and second thermal actuators 130, 140 may each comprise a wax motor wherein the casing 141, 143 contains a contractionally, expandable material with a piston 144, 145 coupled thereto as in the embodiments described above.

First and second valve housings 118, 120 are mounted directly to the first manifold portion 214 of the main body 212 of the valve apparatus 200 and together form a second or intermediate portion 226 of the main body 212 of the valve apparatus 200. The first valve housing 118 has a first end 119 that is received within and sealingly engaged in the corresponding opening 116 formed in the open end 217 of the first manifold portion 214. Similarly, the second valve housing 120 has a first end 121 that is received within and sealingly engaged in the corresponding opening 117 formed in the open end 217 of the first manifold portion 214. Each of the first and second valve housings 118, 120 defines an internal valve chamber 122, 124 for housing a valve mechanism 132, 142 that is operatively coupled to the first or second thermal actuator 130, 140, as in the embodiments described above. The first inlet and outlet 126, 128 are formed in the first valve housing 118 in fluid communication with the valve chamber 122 defined therein, with the first outlet 128 being located at the second end 123 of the first valve housing 118. Similarly, the second inlet and outlet 136, 138 are formed in the second valve housing 120 in fluid communication with the valve chamber 124 defined therein with the second outlet opening 138 being formed at the second end 125 of the second valve housing 120. As shown in the drawings, the first and second inlets 126, 136 may be provided with first and second inlet fittings 234, 235.

The first and second valve mechanisms 132, 142, are similar in structure to those of the embodiments described above, each comprising a sleeve member 146, 148 that is operatively coupled to the piston 144, 145 of the corresponding first or second thermal actuator 130, 140. As in the previously described embodiments, an intermediate shaft 147, 149 interconnects the piston 144, 145 to the corresponding sleeve member 146, 148, each of the intermediate shafts 147, 149 being slidably mounted through a corresponding opening 159 in one of the valve caps 154, 156 that close or seal and thereby fluidly isolate the valve chambers 122, 124 of valve housings 118, 120 from the control bores 222, 224 and main bore 216. Return springs 150, 152 act against the respective sleeve members 146, 148 so as to bias the sleeve members 146, 148 to their first or neutral positions shown in FIG. 12, which shows the first operational state of valve apparatus 200. Accordingly, the valve mechanisms 132, 142 together with the first and second thermal actuators 130, 140 serve to control the flow of a heat exchange fluid through valve apparatus 200.

A second manifold portion 228 is arranged at and secured to the second ends 123, 125 of the first and second valve housings 118, 120 that form the intermediate portion 226 of the main body 212 of the valve apparatus 200. The second manifold portion 228 has a main bore or discharge channel 230 formed therein that is fluidly connected to both the first outlet 128 of the first valve housing 118 and the second outlet 138 of the second valve housing 120 at the second ends 123, 125 thereof, the discharge channel 230 extending through the second manifold portion 228 to a main outlet opening 232 which may be in the form of an outlet fitting. In the subject embodiment, first and second branch channels 231, 233 fluidly interconnect the first and second outlet openings 128, 138 to the discharge channel 230. From the main outlet opening 232, the first fluid is discharged from the valve apparatus 200 and is directed to the second heat exchanger 24.

Figure 12:
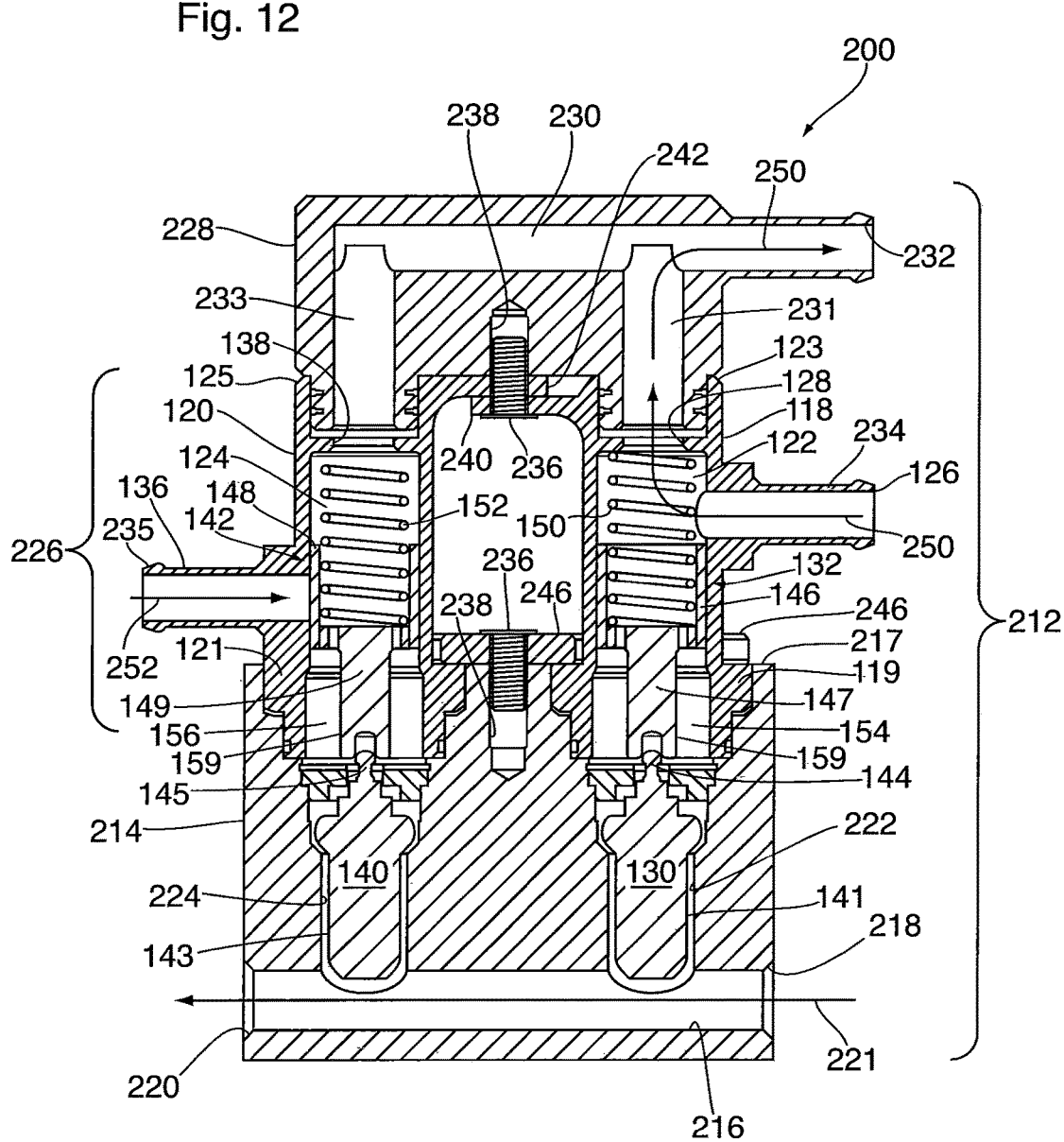
FIG. 12 is a schematic cross-sectional view of another example embodiment of a valve apparatus according to the present disclosure illustrating a first operational state.
Figure 13:
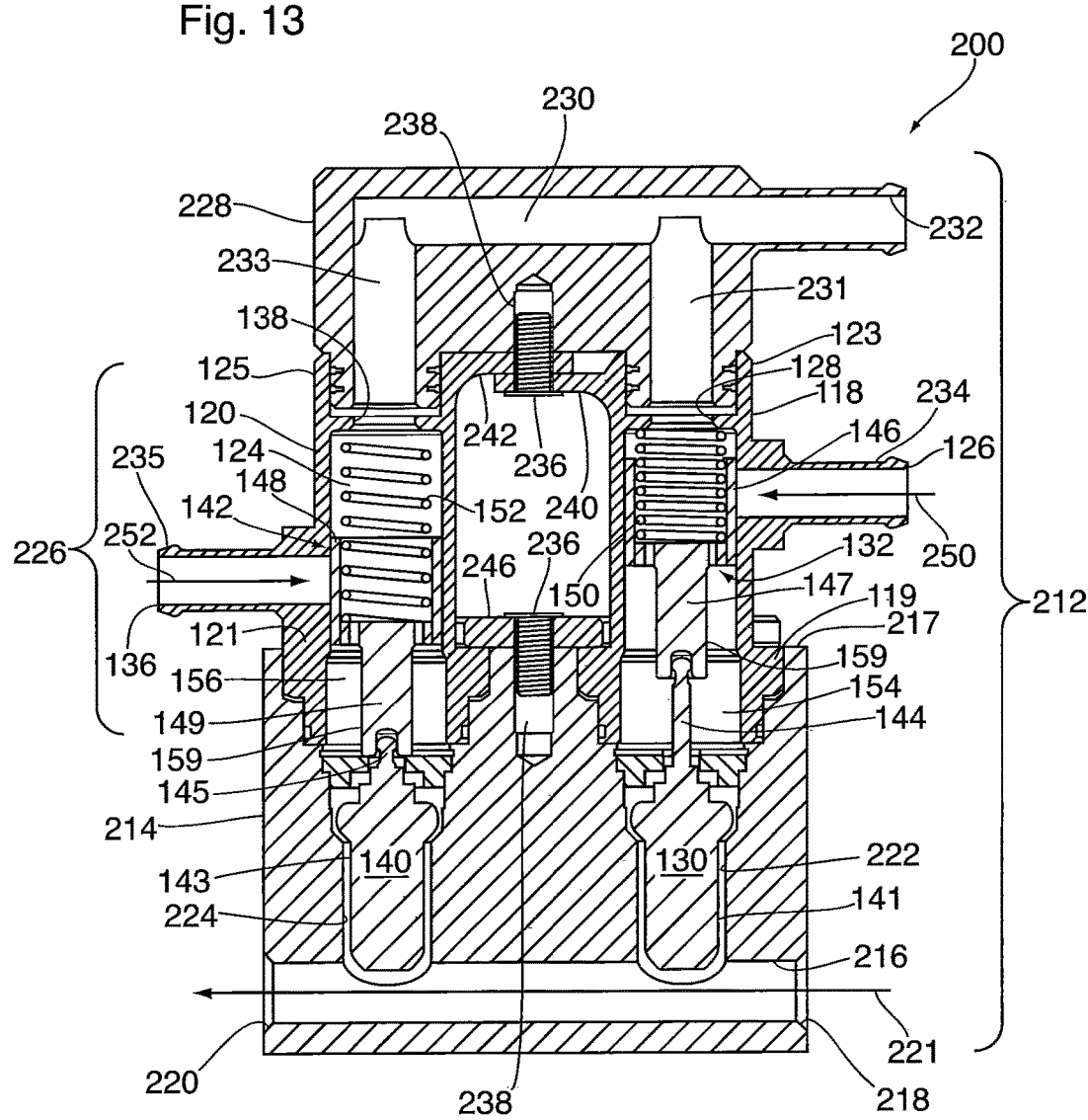
FIG. 13 is a cross-sectional view of the valve apparatus of FIG. 12 in a second operational state.
Figure 14:
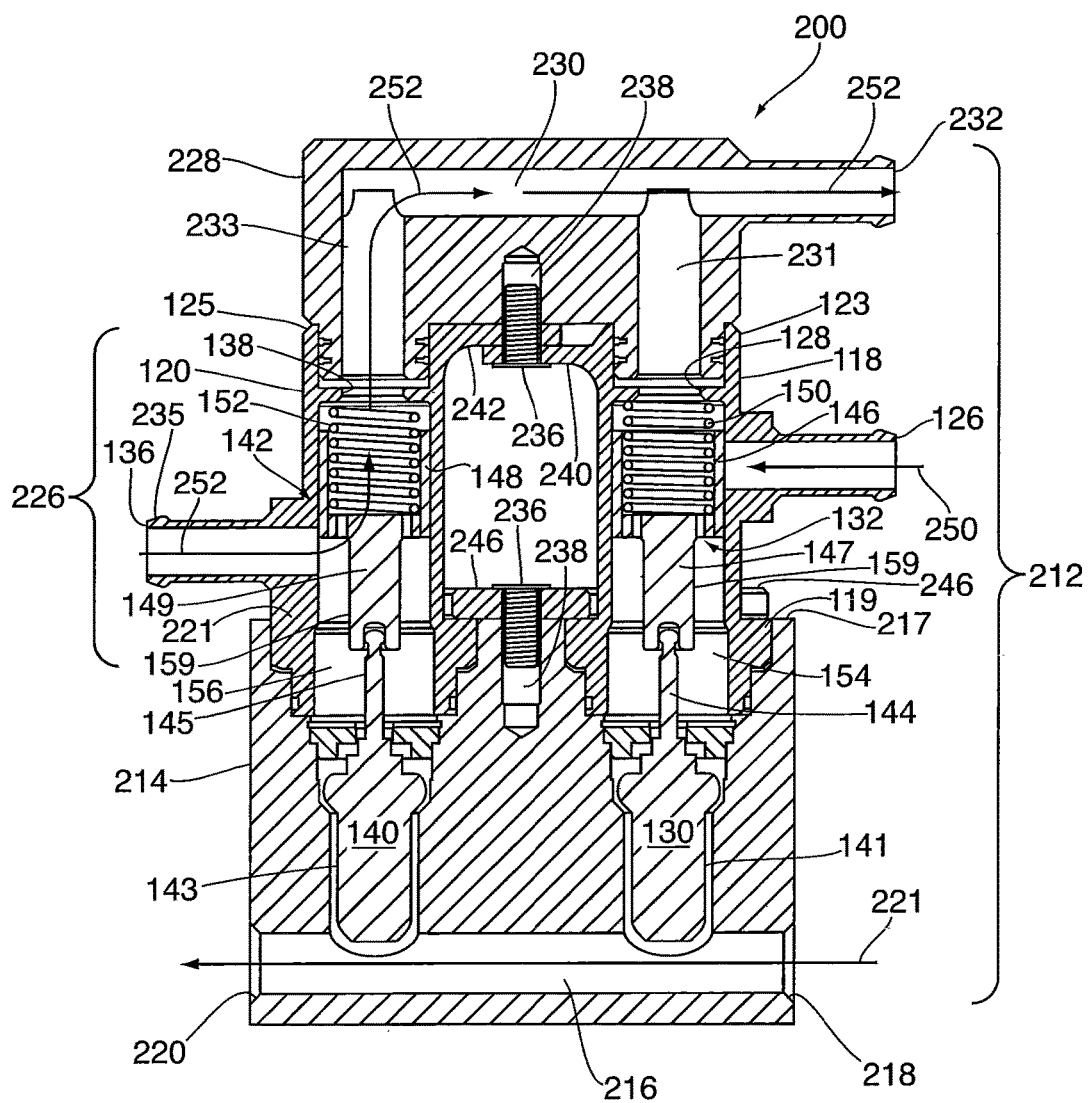
FIG. 14 is a cross-sectional view of the valve apparatus of FIG. 12 in a third operational state.

In the subject embodiment, all three portions 214, 226, 228 of the main body 212 of the valve apparatus 200 are secured together by any suitable means, for example, fastening devices in the form of bolts 236 that extend into corresponding threaded openings 238 formed in the first and second manifold portions 214, 228. As shown in FIGS. 12-14, the first and second valve housings 118, 120 may be formed with apertured flanges 240, 242 that extend outwardly away from the respective valve housings 118, 120. The flanges 240, 242 may overlap each other when the valve housings 118, 120 are secured to the second manifold portion 228, for example by threaded engagement, thereby requiring only a single bolt 236 to secure both the first and second valve housings 118, 120 to the second manifold portion 228.

A single bolt 236 may also be used to secure both the first and second valve housings 118, 120 to the first manifold portion 214 of the main body 212. For example, a locking collar 246 may be arranged around at least a portion of the valve housings 118, 120, the collar 246 having a central aperture for the bolt 236 to extend through. In this manner, the first ends of both the first and second valve housings 118, 120 may be secured to the first manifold portion 214.

While a particular method has been illustrated in FIGS. 12-14 for securing the first and second valve housings 118, 120 to the first and second manifold portions 214, 228 as well as to each other, it will be understood that the present disclosure is not intended to be limited to the particular securing method/arrangement shown and that other means for securing the various portions of the main body 212 together are contemplated and included within the scope of the present disclosure.

Figure 15:
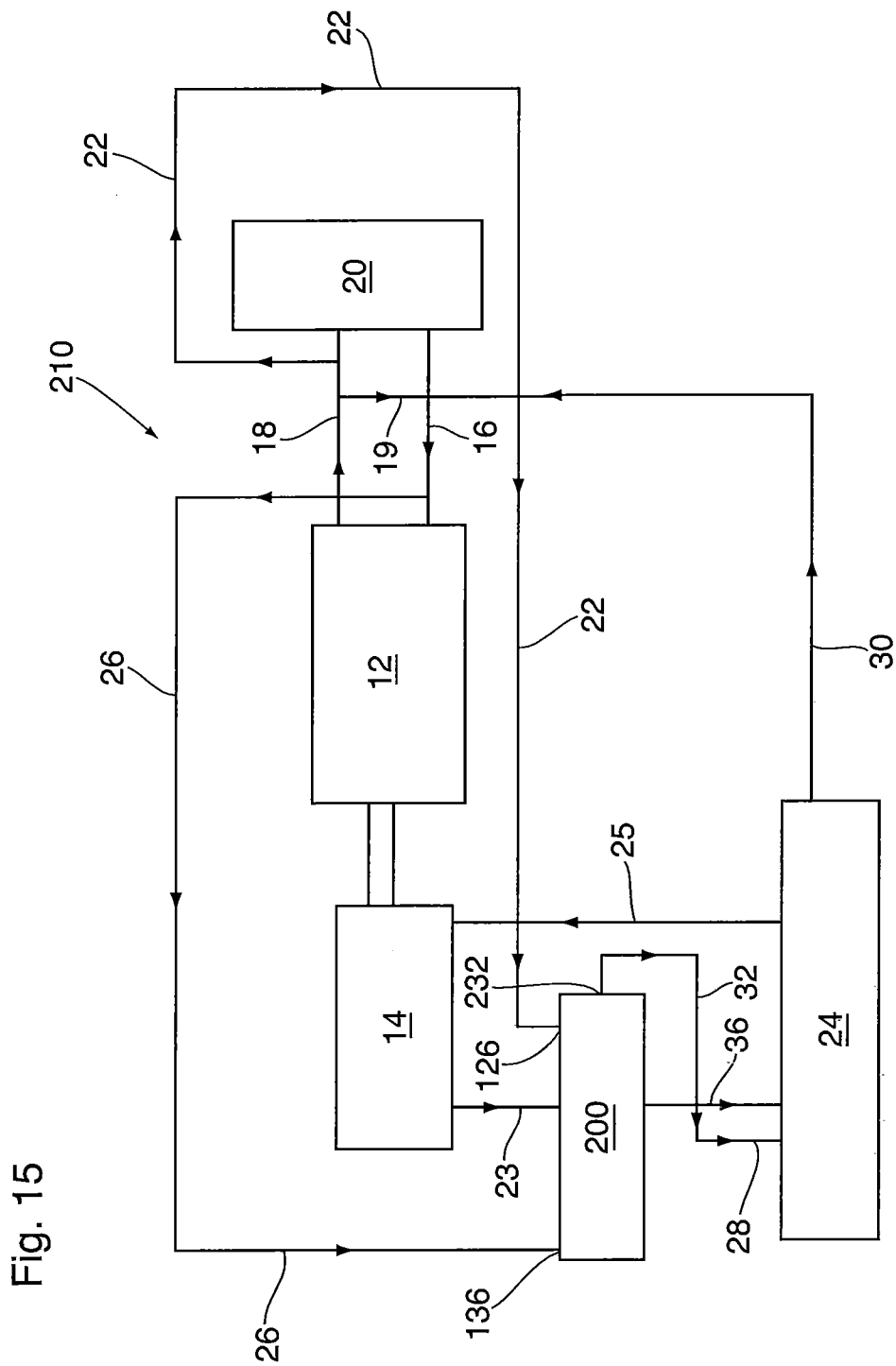
FIG. 15 is a schematic illustration of an exemplary engine and transmission heat exchange circuit incorporating a valve apparatus as shown in FIGS. 12-14.

In use, valve apparatus 200 may be incorporated into the heat exchange circuit 210 shown in FIG. 15. The heat exchange circuit 210 of FIG. 15 shares many common elements with circuits 10 and 110 shown in FIGS. 1 and 11, and like elements are identified therein by like reference numerals.

The first inlet 126 of valve apparatus 200 is fluidly connected to fluid line 22 to receive the heated first fluid, while the second inlet 136 is fluidly connected to fluid line 26 to receive the cooled first fluid. As shown in FIG. 12, when the valve apparatus 200 is in its first operational state, the first valve mechanism 132 is in its first or neutral position with the sleeve member 146 being in its most retracted position leaving first inlet 126 open to receiving the heated first fluid from fluid line 22, the heated first fluid being transmitted through the first valve chamber 122 and through the first branch channel 231 to fluid outlet 232 as illustrated by flow directional arrows 250. As shown in FIG. 15, the fluid outlet 232 is connected to the second heat exchanger 24 through fluid outlet line 32 and heat exchanger inlet line 28, there being no fluid line 34 in this embodiment since valve apparatus 200 has only one fluid outlet 232.

The second valve mechanism 142 is also in its first or neutral position with the sleeve member 148 being in its most retracted position. However, due to the placement of the second inlet 136, which in the subject embodiment is lower or downwardly offset with respect to the position of the first inlet 126, the second inlet 136 is blocked by the valve sleeve member 148 effectively preventing access of the cooled first fluid to valve chamber 124.

As set out above, the valve mechanisms 132, 142 are controlled by their corresponding thermal actuators 130, 140 which, in turn, are activated based on the temperature of the control fluid (transmission fluid or oil) flowing through main bore 216 in the first manifold portion 214 of the main body 212 of the valve apparatus 200. Accordingly, when the temperature of the control fluid is below both of the activation temperatures associated with each of the thermal actuators 130, 140, for instance at a temperature below 75 degrees C., the first and second valve mechanisms 132, 142 are both in their first, neutral positions allowing heated first fluid to be transmitted through the valve apparatus 200 through first valve chamber 122 while preventing the cooled first fluid from being transmitted through the second valve chamber 124. While the second valve chamber 124 is fluidly coupled to the discharge channel 230 via branch channel 233, the sleeve member 148 is blocking the second inlet 136, and therefore the cooled first fluid does not enter the second valve chamber 124. Accordingly, in the first operational state, the heated first fluid from fluid line 22 flows through the valve 200 to the second heat exchanger 24, to actively heat the second fluid therein. Furthermore, the heated first fluid is fluidly isolated from the cooled first fluid in fluid line 26.

As the temperature of the control fluid increases, e.g. to a temperature within a first predetermined temperature range of about 75-85 degrees C., the valve apparatus is caused to adopt a second operational state, illustrated in FIG. 13. The heating of the control fluid to this range activates the first thermal actuator 130, causing the piston 144 to be pushed out of the casing 141 of first thermal actuator 130, causing the sleeve member 146 of first valve mechanism 132 to move along the valve chamber 122 to its second position, wherein the sleeve member 146 blocks first inlet 126. This prevents the heated first fluid from fluid line 22 from entering the first inlet 126 and being transmitted through valve chamber 122 to fluid outlet 232. Accordingly, in the second operational state of valve apparatus 200, the first valve mechanism 132 is in its second, closed position while the second valve mechanism 142 remains in its first, neutral position where the valve mechanism 142 is also closed. Accordingly, when the temperature of the control fluid is within the first predetermined temperature range, i.e. greater than the first activation temperature associated with the first thermal actuator and less than the activation temperature of the second thermal actuator 140, for instance less than about 90 degrees C., the valve apparatus 200 remains in the second operation state illustrated in FIG. 13. In this configuration, no heated first fluid or cooled first fluid is permitted to flow through the valve apparatus 200 to the second heat exchanger 24. Accordingly, in the second operational state, the second fluid is not actively heated or cooled by the first fluid as it circulates through the second heat exchanger 24.

As the temperature of the control fluid further increases to the second predetermined temperature, e.g. to a temperature of about 90 degrees C., the first valve mechanism 132 remains in its second position with sleeve member 146 effectively first inlet 126 while the second valve mechanism 142 begins to activate as the temperature of the control fluid flowing through main bore 216 causes the second thermal actuator 140 to activate, pushing piston 145 out of casing 143, thereby causing sleeve member 148 to slide along the second valve chamber 124 so as to open second inlet 136, the valve apparatus 200 thereby assuming its third operational state illustrated in FIG. 14. In this third operational state, the first valve mechanism 132 remains in its second, closed position, preventing the heated first fluid from fluid line 22 from being transmitted through valve chamber 122 while the second valve mechanism 142 is in its second, open position, allowing cooled first fluid from fluid line 26 to be transmitted through the second valve chamber 124 to fluid outlet 232 as illustrated by flow directional arrows 252 in FIG. 14. In this configuration, only the cooled first fluid is permitted to flow through the valve apparatus 200 to the second heat exchanger 24. Accordingly, in the third operational state, the second fluid is actively cooled by the first fluid as it circulates through the second heat exchanger 24.

As the temperature of the control fluid continues to increase, the valve apparatus 200 remains in its third operational state to direct the cooled first fluid from fluid line 26 through valve chamber 124 to and second branch channel 233 to outlet 232. Once again, even though the first valve chamber 122 is fluidly connected to discharge channel 230 and fluid outlet 232 via branch channel 231, the cooled first fluid from the fluid line 26 passing through the discharge channel 230 is prevented from entering the first valve chamber 122 through first outlet 128 due to flow resistance created by blocking the first inlet 126. Therefore, the heated and cooled first fluid in fluid lines 22, 26 remain fluidly isolated from each other in each of the operational states of valve apparatus 200.

While various embodiments of the valve apparatus and overall system have been described, it will be understood that certain adaptations and modifications of the described embodiments can be made. Therefore, the above discussed embodiments are considered to be illustrative and not restrictive.

What is claimed is:

1. A valve apparatus, comprising:
   a first valve chamber having a first inlet for receiving a fluid from a first fluid source and a first outlet for discharging said fluid from said first valve chamber;
   a second valve chamber having a second inlet for receiving a fluid from a second fluid source and a second outlet for discharging said fluid from said second valve chamber;
   a control chamber fluidly isolated from said first valve chamber and said second valve chamber, said control chamber having a control fluid inlet for receiving a control fluid from a control fluid source and a control fluid outlet for discharging said control fluid from said control chamber of said valve apparatus;
   a first valve mechanism arranged within said first valve chamber for controlling fluid flow between said first inlet and said first outlet;
   a second valve mechanism arranged within said second valve chamber for controlling fluid flow between said second inlet and second outlet;
   a thermal actuator arranged within said control chamber and operatively coupled to said first valve mechanism and said second valve mechanism, said thermal actuator having a first activation temperature associated with said first valve mechanism and a second activation temperature associated with said second valve mechanism;

wherein said first valve chamber is fluidly isolated from said second valve chamber.

2. The valve apparatus as claimed in claim 1, further comprising an outlet fluid line interconnecting said first outlet and said second outlet.

3. The valve apparatus as claimed in claim 1, further comprising:
a main body having a main bore formed therein extending therethrough from a first open end to a second open end;
a first valve housing secured to said main body at said first open end and defining said first valve chamber;
a second valve housing secured to said main body at said second open end and defining said second valve chamber;
wherein said main bore interconnects said first valve chamber and said second valve chamber defining said control chamber;
a first valve cap arranged at the junction of said first valve chamber and said control chamber fluidly isolating said first valve chamber from said control chamber;
a second valve cap arranged at the junction of said second valve chamber and said control chamber fluidly isolating said second valve chamber from said control chamber; and
wherein said second activation temperature is greater than said first activation temperature and wherein said at least one thermal actuator is operatively coupled to the first and second valve mechanisms through said first and second valve caps, respectively.

4. The valve apparatus as claimed in claim 3, wherein said thermal actuator comprises a first thermal actuator operatively coupled to said first valve mechanism and a second thermal actuator operatively coupled to said second valve mechanism, said first and second actuators each comprising an actuator casing for housing a corresponding thermal material and a piston having a first end mounted within the corresponding actuator casing and a second end protruding from said actuator casing, wherein said piston is moveable between a first retracted position and a second extended position, the piston of said first actuator being operatively coupled to said first valve mechanism and the piston of said second actuator being operatively coupled to said second valve mechanism.

5. The valve apparatus as claimed in claim 1, having:
a first operational state wherein said first valve mechanism has a first, open position permitting fluid flow between said first inlet and first outlet and said second valve mechanism is in a first, closed position preventing fluid flow between said second inlet and said second outlet;
a second operational state wherein said first valve mechanism is in a second, closed position preventing fluid flow between said first inlet and said first outlet and said second valve mechanism is in said first, closed position preventing fluid flow between said second inlet and said second outlet; and
a third operational state wherein said first valve mechanism is in said second closed position preventing fluid flow between said first inlet and said first outlet and said second valve mechanism is in a second, open position permitting fluid flow between said second inlet and second outlet;

wherein fluid from said first fluid source is directed to said outlet fluid line in said first operational state, and fluid from said second fluid source is directed to said outlet fluid line in said third operational state.

6. The valve apparatus as claimed in claim 3, wherein said at least one thermal actuator comprises an actuator housing having first and second chambers formed therein for housing respective first and second thermal materials;
a first piston operatively coupled to said first thermal material housed within said first chamber and movable between a first retracted position and second expanded position, said first piston being operatively coupled to said first valve mechanism;
a second piston operatively coupled to said second thermal material within said second chamber and movable between a first retracted position and second expanded position, said second piston being operatively coupled to said second valve mechanism.

7. The valve apparatus as claimed in claim 4, wherein said first and second valve caps each comprise a first end for sealingly engaging within an open end of the corresponding first or second valve housing, and a second end for engaging with the corresponding thermal actuator, each valve cap having an opening extending therethrough for receiving the piston of the corresponding actuator, the piston being slidalble within the opening formed in said corresponding valve cap;
wherein said first valve mechanism and said second valve mechanism each comprise:
a sleeve member slidable within the first or second valve chamber and being sized so as to seal against the walls of the corresponding first or second valve chamber;
an intermediate shaft extending away from an end of said sleeve member and slidingly engaged within the opening extending through the corresponding valve cap, the intermediate shaft engaging with the piston of the corresponding thermal actuator for movement with the piston.

8. A valve apparatus, comprising:
a main body having a main bore formed therein;
a first valve housing secured to said main body and defining a first valve chamber;
a second valve housing secured to said main body and defining a second valve chamber;
a first inlet and a first outlet formed in said first valve housing in fluid communication with said first valve chamber;
a second inlet and a second outlet in fluid communication with said second valve chamber;
a first valve mechanism arranged within said first valve housing for controlling flow from said first inlet to said first outlet;
a second valve mechanism arranged within said second valve housing for controlling flow from said second inlet to said second outlet;
a thermal actuator positioned in said main bore of said main body and operatively coupled to said first valve mechanism and said second valve mechanism, said thermal actuator having a first activation setting for operating said first valve mechanism and a second activation setting for operating said second valve mechanism;
a control fluid inlet opening formed in said main body and extending into said main bore providing fluid access to said thermal actuator and a control fluid outlet opening formed in said main body for discharging a control fluid from said main bore;

wherein said first valve chamber is fluidly isolated from said second valve chamber.

9. The valve apparatus as claimed in claim 8, wherein said thermal actuator comprises a first thermal actuator arranged within said main bore and operatively coupled to said first valve mechanism and a second thermal actuator arranged within said main bore adjacent to said first thermal actuator and operatively coupled to said second valve mechanism, wherein said first and second thermal actuators are fluidly isolated from said first and second valve chambers.

10. The valve apparatus as claimed in claim 8, wherein said thermal actuator comprises an actuator housing having first and second chambers formed therein for housing respective first and second thermal materials;
  a first piston operatively coupled to said first thermal material housed within said first chamber and movable between a first retracted position and second expanded position, said first piston being operatively coupled to said first valve mechanism;
  a second piston operatively coupled to said second thermal material within said second chamber and movable between a first retracted position and second expanded position, said second piston being operatively coupled to said second valve mechanism.

11. The valve apparatus as claimed in claim 8, wherein said main body comprises a first body portion having a first main bore formed therein and a second body portion having a second main bore formed therein, the first body portion and the second body portion being arranged separately to one another, the first valve housing being secured to said first body portion and said second valve housing being-secured to said second body portion; and
  wherein said thermal actuator comprises a first thermal actuator arranged within said first main bore of said first body portion and operatively coupled to said first valve mechanism and a second thermal actuator arranged within said second main bore of said second body portion and operatively coupled to said second valve mechanism; and
  wherein said first body portion and said second body portion each have a control fluid inlet opening and a control fluid outlet opening formed therein for bringing the control fluid into contact with said first and second thermal actuators.

12. The valve apparatus as claimed in claim 8, wherein said first valve mechanism is movable from a first position wherein said first outlet is open allowing fluid flow through said first valve chamber from said first inlet to said first outlet and a second valve position wherein said first outlet is closed preventing fluid flow through said first valve chamber; and
  wherein said second valve mechanism is movable from a first position wherein said second outlet is closed preventing fluid flow through said second valve chamber and a second valve position wherein said second outlet is open permitting fluid flow through said second valve chamber from said second inlet to said second outlet.

13. The valve apparatus as claimed in claim 8, wherein said first activation setting is a first predetermined temperature range and said second activation setting is a second predetermined temperature, wherein said second predetermined temperature is greater than said first predetermined temperature range;
  the valve apparatus having a first operational state wherein said first valve mechanism is in an open position and said second valve mechanism is in a closed position, a second operational state wherein said first valve mechanism is in a closed position and said second valve mechanism is in a closed position, and a third operational state wherein said first valve mechanism is in a closed position and said second valve mechanism is in an open position.

14. The valve apparatus as claimed in claim 8, further comprising a first valve cap arranged at the junction of said first valve housing and said main bore of said main body for sealing said first valve chamber and a second valve cap arranged at the junction of said second valve housing and said main bore for sealing said second valve chamber, wherein said thermal actuator is operatively coupled to the first and second valve mechanisms through said first and second valve caps, respectively.

15. A system for warming and/or cooling transmission fluid in an automobile vehicle having an engine and a transmission, comprising:
  a heat exchanger fluidly connected to the transmission for receiving transmission fluid exiting the transmission and directing transmission fluid back to the transmission via a return line, the heat exchanger having an inlet for receiving a coolant stream for heat transfer with the transmission fluid, and an outlet for discharging said coolant source from said heat exchanger;
  a valve apparatus arranged intermediate said transmission and said heat exchanger and being fluidly coupled to said transmission for receiving transmission fluid exiting said transmission and delivering said transmission fluid to said heat exchanger, the valve apparatus having a first valve chamber for receiving coolant from a first fluid source and a second valve chamber for receiving coolant from a second fluid source, the first valve chamber and second valve chamber each having a fluid outlet that are interconnected by a discharge channel that is fluidly coupled to an inlet of said heat exchanger for delivering the first or second coolant source to said heat exchanger;
  a first valve mechanism arranged within said first valve chamber for controlling flow of said first coolant source to said heat exchanger;
  a second valve mechanism arranged within said second valve chamber for controlling flow of said second coolant source to said heat exchanger;
  wherein said first valve chamber is fluidly isolated from said second valve chamber and wherein only one of said first coolant source and said second coolant source is directed through the discharge channel to the heat exchanger inlet at any one a time.

16. The system as claimed in claim 15, wherein the valve apparatus further comprises a control chamber fluidly isolated from both said first and second valve chambers for receiving and discharging transmission fluid therethrough; and
  a thermal actuator arranged within said control chamber for sensing the temperature of said transmission fluid, the thermal actuator being operatively coupled to said first and second valve mechanisms and activating at said first predetermined temperature to move said first valve mechanism from said first, neutral position to said second activated position, the thermal actuator activating at said second predetermined temperature to move said second valve mechanism from said first neutral position to said second activated position;
  wherein said first valve mechanism has a first predetermined activation temperature and said second valve mechanism has a second predetermined activation temperature that is greater than said first predetermined activation temperature, said first and second valve mechanisms being activated based on the temperature of the transmission fluid being transmitted through said valve apparatus;

the first valve mechanism having a first, neutral position permitting fluid flow through said first valve chamber and a second, activated position preventing fluid flow through said first valve chamber;

the second valve mechanism having a first, neutral position preventing fluid flow through said first valve chamber and a second, activated position permitting fluid flow through said first valve chamber;

the system having a first operational state wherein said first and second valve mechanisms are in their respective first, neutral position, a second operation state wherein the first valve mechanism is in its second activated position and said second valve mechanism is in its first neutral position, and a third operational state wherein said first valve and second valve mechanisms are in their respective second, activated positions.

17. The system as claimed in claim 16, wherein the first operational state corresponds to the transmission fluid having a temperature less than 75 degrees C.; the second operational state corresponds to the transmission fluid having a temperature between 85-90 degrees C.; and wherein the third operational state corresponds to the transmission fluid having a temperature greater than 100 degrees C.

18. The system as claimed in claim 15, wherein the valve apparatus comprises:
   a first manifold portion for transmitting a control fluid therethrough, said manifold portion having a fluid passage extending therethrough between a control fluid inlet and a control fluid outlet;
   an intermediate portion mounted to said first manifold portion, the intermediate portion comprising said first valve chamber and said second valve chamber, the first and second valve chambers of said intermediate portion being fluidly isolated from said first manifold portion and fluidly isolated from each other;
   a first thermal actuator having a first activation temperature arranged within said first manifold portion in fluid communication with said fluid passage formed therein and operatively coupled to said first valve mechanism;
   a second thermal actuator having a second activation temperature arranged within said first manifold portion in fluid communication with said fluid passage formed therein and operatively coupled to said second valve mechanism, wherein said second activation temperature is greater than said first activation temperature; and
   a second manifold portion mounted to said intermediate portion and having a discharge channel formed therein that is fluidly coupled to both said first valve chamber and said second valve chamber and extends to a fluid outlet for discharging either said first fluid source or said second fluid source from said valve apparatus.

19. A valve apparatus, comprising:
   a first manifold portion for transmitting a control fluid therethrough, said first manifold portion having a fluid passage extending therethrough between a control fluid inlet and a control fluid outlet;
   an intermediate portion mounted to said first manifold portion, the intermediate portion having a first valve chamber and a second valve chamber, the first valve chamber having a first inlet for receiving a fluid from a first fluid source and a first outlet for discharging said fluid from said first valve chamber, the second valve chamber having a second inlet for receiving a fluid from a second fluid source and a second outlet for discharging said fluid from said second valve chamber, the first and second valve chambers of said intermediate portion being fluidly isolated from said first manifold portion and fluidly isolated from each other;
   a first valve mechanism arranged within said first valve chamber for controlling fluid flow between said first inlet and said first outlet;
   a second valve mechanism arranged within said second valve chamber for controlling fluid flow between said second inlet and second outlet;
   a first thermal actuator having a first activation temperature arranged within said first manifold portion in fluid communication with said fluid passage formed therein and operatively coupled to said first valve mechanism;
   a second thermal actuator having a second activation temperature arranged within said first manifold portion in fluid communication with said fluid passage formed therein and operatively coupled to said second valve mechanism, wherein said second activation temperature is greater than said first activation temperature; and
   a second manifold portion mounted to said intermediate portion and having a discharge channel formed therein that is fluidly coupled to both said first valve chamber and said second valve chamber and extends to a fluid outlet for discharging either said first fluid source or said second fluid source from said valve apparatus.

20. The valve apparatus as claimed in claim 19, wherein said intermediate portion comprises:
   a first valve housing having a first end secured to said first manifold portion, said first valve housing defining said first valve chamber;
   a second valve housing having a first end secured to said first manifold portion, said second valve housing defining said second valve chamber;
   wherein said second manifold portion is secured to both said first and second valve housings; and
   wherein said first and second valve housings are secured together and mounted to said first and second manifold portions.

21. The valve apparatus as claimed in claim 19, having:
   a first operational state wherein said first valve mechanism is in a first, open position permitting fluid flow between said first inlet and first outlet and said second valve mechanism is in a first, closed position preventing fluid flow between said second inlet and said second outlet;
   a second operational state wherein said first valve mechanism is in a second, closed position preventing fluid flow between said first inlet and said first outlet and said second valve mechanism is in said first, closed position preventing fluid flow between said second inlet and said second outlet; and
   a third operational state wherein said first valve mechanism is in said second closed position preventing fluid flow between said first inlet and said first outlet and said second valve mechanism is in a second, open position permitting fluid flow between said second inlet and second outlet;
   wherein said first valve chamber is in fluid communication with said discharge-channel in only said first operational state and wherein said second valve chamber is in fluid communication with said discharge channel only in said third operational state.

* * * * *